(12) United States Patent
Ito et al.

(10) Patent No.: US 9,251,624 B2
(45) Date of Patent: Feb. 2, 2016

(54) POINT CLOUD POSITION DATA PROCESSING DEVICE, POINT CLOUD POSITION DATA PROCESSING SYSTEM, POINT CLOUD POSITION DATA PROCESSING METHOD, AND POINT CLOUD POSITION DATA PROCESSING PROGRAM

(71) Applicant: KABUSHIKI KAISHA TOPCON, Itabashi-ku, Tokyo (JP)

(72) Inventors: Tadayuki Ito, Tokyo (JP); Nobuo Kochi, Tokyo (JP); Hitoshi Otani, Tokyo (JP); Kazuo Kitamura, Tokyo (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 351 days.

(21) Appl. No.: 13/763,336

(22) Filed: Feb. 8, 2013

(65) Prior Publication Data

US 2013/0176305 A1 Jul. 11, 2013

Related U.S. Application Data

(63) Continuation of application No. PCT/JP2011/067891, filed on Aug. 4, 2011.

(30) Foreign Application Priority Data

Aug. 11, 2010 (JP) .................................. 2010-180531

(51) Int. Cl.
*G06T 15/00* (2011.01)
*G06T 17/00* (2006.01)
(Continued)

(52) U.S. Cl.
CPC .............. *G06T 17/00* (2013.01); *G01C 15/002* (2013.01); *G06T 17/10* (2013.01); *G06T 2200/08* (2013.01); *G06T 2200/24* (2013.01); *G06T 2210/56* (2013.01)

(58) Field of Classification Search
None
See application file for complete search history.

(56) References Cited

U.S. PATENT DOCUMENTS 5,988,862 A 11/1999 Kacyra et al.
7,184,036 B2 2/2007 Dimsdale et al.
(Continued)

FOREIGN PATENT DOCUMENTS

JP 2000-509150 A 7/2000
JP 2000-230809 A 8/2000
(Continued)

OTHER PUBLICATIONS

Peter Allen, loannis Stamos, Atanas Geuorguiev, Ethan Gold, Paul Blaer, "Avenue: Automated Site Modeling in Urban Environments", Jun. 1, 2001, IEEE. Proceedings of Third International Conference on 3-D Digital Imaging and Modeling, 2001, pp. 357-364.*
(Continued)

*Primary Examiner* — Robert Bader
(74) *Attorney, Agent, or Firm* — Brinks Gilson & Lione

(57) ABSTRACT

The device includes a unit obtaining an object's point cloud position data, a unit obtaining the object's image data, a unit in which co-relationship between point cloud position data obtained in the point cloud position data obtaining unit through a primary viewpoint or image data obtained in the image data obtaining unit through the primary viewpoint and image data obtained in the image data obtaining unit through a secondary (different from the primary) viewpoint are identified, a unit forming a three-dimensional model by the data obtained in the point cloud position data obtaining unit, and a unit controlling displaying of the model formed in the model forming unit on a displaying device. The model forming unit forms a three-dimensional model having direction seen from the secondary viewpoint, depending on the co-relationship identified in the co-relationship identifying unit. Operators see the model seen from the secondary viewpoint as an image.

1 Claim, 13 Drawing Sheets

(51) Int. Cl.
*G06T 17/10* (2006.01)
*G01C 15/00* (2006.01)

(56) References Cited

U.S. PATENT DOCUMENTS

| | | |
|---|---|---|
| 7,215,430 B2 | 5/2007 | Kacyra et al. |
| 2002/0001406 A1 | 1/2002 | Kochi et al. |
| 2005/0213808 A1 | 9/2005 | Ohtomo et al. |
| 2006/0167648 A1 | 7/2006 | Ohtani |
| 2009/0220144 A1 | 9/2009 | Mein et al. |

FOREIGN PATENT DOCUMENTS

| | | |
|---|---|---|
| JP | 2001-280956 A | 10/2001 |
| JP | 2004-037396 A | 2/2004 |
| JP | 2004-259114 A | 9/2004 |
| JP | 2004-272459 A | 9/2004 |
| JP | 2005-024370 A | 1/2005 |
| JP | 2005-077385 A | 3/2005 |
| JP | 2005-283221 A | 10/2005 |
| WO | WO 97/40342 A2 | 10/1997 |
| WO | WO 2005/017644 A2 | 2/2005 |
| WO | WO 2009127526 A1 * | 10/2009 |

OTHER PUBLICATIONS

Michael K. Reed, Peter K. Allen, "Constraint-Based Sensor Planning for Scene Modeling", Dec. 2000, IEEE, IEEE Transactions on Pattern Analysis and Machine Intelligence, vol. 22, No. 12, pp. 1460-1467.*

Paul S. Blaer, Peter K. Allen, "Data Acquisition and View Planning for 3-D Modeling Tasks", Nov. 2, 2007, IEEE, Proceedings of the 2007 IEEE/RSJ International Conference on Intelligent Robots and Systems, pp. 417-422.*

Michael K. Reed, Peter K. Allen, "3-D Modeling from Range Imagery: An Incremental Method with a Planning Component", Feb. 1999, Elsevier, Image and Vision Computing, vol. 17, Issue 2, pp. 99-111.*

Ioannis Stamos, Peter K. Allen, "Integration of Range and Image Sensing for Photorealistic 3D Modeling", Apr. 2000, IEEE, Proceedings of the IEEE International Conference on Robotics & Automation, pp. 1435-1440.*

Ioannis Stamos, Peter K. Allen, "3-D Model Construction Using Range and Image Data", Jun. 15, 2000, IEEE, Proceedings of the IEEE Conference on Computer Vision and Pattern Recognition, 2000, vol. 1, pp. 531-536.*

William R. Scott, Gerhard Roth, Jean-Fancois Rivest, "View Planning for Automated Three-Dimensional Object Reconstruction and Inspection", Mar. 2003, ACM, ACM Computing Surveys, vol. 35, No. 1, pp. 64-96.*

Jasna Mayer, Ruzena Bajesy, "Occlusions as a Guide for Planning the Next View", May 1993, IEEE, IEEE Transactions on Pattern Analysis and Machine Intelligence, vol. 15, No. 5, pp. 417-433.*

International Search Report for International Application No. PCT/JP2011/067891, dated Oct. 25, 2011, 2 pages.

* cited by examiner

POINT CLOUD POSITION DATA PROCESSING DEVICE, POINT CLOUD POSITION DATA PROCESSING SYSTEM, POINT CLOUD POSITION DATA PROCESSING METHOD, AND POINT CLOUD POSITION DATA PROCESSING PROGRAM

RELATED APPLICATIONS

This application is a continuation of PCT/JP2011/067891 filed on Aug. 4, 2011, which claims priority to Japanese Application No. 2010-180531 filed on Aug. 11, 2010. The entire contents of these applications are incorporated herein by reference

FIELD OF THE INVENTION

The present invention relates to a point cloud position data processing technique, and specifically relates to a technique efficiently obtaining a point cloud position data of an occlusion part in which the point cloud position data cannot be obtained due to being blocked by a nearby object to be measured.

DESCRIPTION OF RELATED ART

A method for generating a three-dimensional model from point cloud position data of an object to be measured has been known. In the point cloud position data, a two-dimensional image and three-dimensional coordinates are combined. That is, in the point cloud position data, data of two-dimensional image of an object, plurality of measured points (point cloud) corresponding to this two-dimensional image, and position of three-dimensional space (three-dimensional coordinate) of these plurality of measured points are related. By the point cloud position data, three-dimensional model in which surface configuration of the object is duplicated by a series of points can be obtained. In addition, since each three-dimensional coordinate is obvious, relative positional relationship in three-dimensional space among the points can be understood; therefore, a processing revolving around the three-dimensional model image displayed and a processing switching to an image seen from a different viewpoint can be realized.

For example, in the invention disclosed in the reference 1 below, a scanning laser device scans a three-dimensional object and generates point clouds. The point cloud is separated into a group of edge points and a group of non-edge points, based on changes in depths and normal lines of the scanned points. Each group is fitted to geometric original drawings, and the fitted geometric original drawings are extended and are crossed, whereby a three-dimensional model is generated.

In the invention disclosed in the reference 2 below, segments (triangular polygons) are formed from point cloud position data, and edges and planes are extracted based on continuity, direction of normal line, or distance, of adjacent polygons. Then, the point cloud position data of each segment is converted into a plane equation or a curve equation by the least-squares method and is grouped by planarity and curvature, whereby a three-dimensional model is generated.

In the invention disclosed in reference 3 below, two-dimensional rectangular areas are set for three-dimensional point cloud position data, and synthesized normal vectors of measured points in the rectangular areas are obtained. All of the measured points in the rectangular area are rotationally shifted so that the synthesized normal vector corresponds to a z-axis direction. Standard deviation $\sigma$ of the z value of each of the measured points in the rectangular area is calculated. Then, when the standard deviation $\sigma$ exceeds a predetermined value, the measured point corresponding to the center point in the rectangular area is processed as noise.

Reference 1: Japanese Unexamined Patent Application Publication (Translation of PCT Application) No. 2000-509150

Reference 2: Japanese Unexamined Patent Application Laid-open No. 2004-272459

Reference 3: Japanese Unexamined Patent Application Laid-open No. 2005-024370

SUMMARY OF THE INVENTION

In the case in which point cloud position data is obtained by using a laser scanner, point cloud position data of a part which is behind an object seen from the laser scanner cannot be obtained since the part is in the shadow of the object. This phenomenon generating shadow part is called occlusion. Point cloud position data of the shadow part which cannot be obtained, can be obtained by moving the viewpoint to a position from which laser light can be emitted to the shadow part and by scanning again.

However, in order to solve the occlusion by this method, a processing of position adjustment is required, in order to handle up to hundreds of millions of point cloud position data obtained from each of two viewpoints in a common coordinate system. This processing is complicated and takes a long time to process. Therefore, in the case in which the occlusion is not solved after obtaining point cloud data again and performing data processing, there are the following problems, (1) measuring operation must be performed again while bringing a laser scanner to the site and the operation is complicated, (2) there is a case in which the above-mentioned position adjustment cannot be performed since time has passed and a situation at the site has been changed, and (3) even if new point cloud position data is obtained again, there is no way to confirm whether or not the occlusion is solved without performing post-processing.

In order to prevent this problem, an operator who operates obtaining point cloud position data using a laser scanner conventionally selects a position of another viewpoint, according to experience or intuition, to solve the occlusion. However, such a method depending on experience or intuition may cause differences of operating efficiency among operators, and there is a problem from the viewpoint of convenience of techniques obtaining a three-dimensional model based on point cloud position data. In view of such circumstances, an object of the present invention is to provide a technique in which new information to decide a position of a new viewpoint for solving occlusion is provided to an operator.

In the invention according to claim 1, the present invention provides a point cloud position data processing device including: a point cloud position data obtaining unit for obtaining point cloud position data of an object to be measured, an image data obtaining unit for obtaining image data of the object, a correspondence relationship identifying unit in which correspondence relationship between point cloud position data obtained in the point cloud position data obtaining unit through a primary viewpoint or image data obtained in the image data obtaining unit through the primary viewpoint and image data obtained in the image data obtaining unit through a secondary viewpoint which is different from the primary viewpoint are identified, a three-dimensional model forming unit forming a three-dimensional model by the point cloud position data obtained in the point cloud position data obtaining unit, and a three-dimensional model display controlling unit controlling for displaying the three-dimensional model formed in the three-dimensional model forming unit on an image displaying device, wherein the three-dimensional model forming unit forms a three-dimensional model having direction seen from the secondary viewpoint, depending on the correspondence relationship identified in the correspondence relationship identifying unit.

According to the invention as recited in claim 1, by corresponding the point cloud position data (or the image data) obtained from the primary viewpoint and the image data obtained from the secondary viewpoint, the three-dimensional model of the object to be measured of the case seen from the secondary viewpoint is formed, based on the point cloud position data obtained from the primary viewpoint. That is, when changing position of viewpoint for measuring (observing point), the three-dimensional model seen from the new viewpoint is calculated based on the point cloud position data obtained from the primary viewpoint. In this way, visualization of the occlusion part by changing viewpoint is accomplished. That is, by changing viewpoint, the occlusion part can be facilitated to be recognized in the image. In this way, it may become easy for an operator to understand a new viewpoint appropriate for solving the occlusion.

In the invention according to claim 2, according to the invention recited in claim 1, the image data obtaining unit has a function of obtaining image data depending on point cloud position data including data of intensity of reflect light, or a function of receiving image data output from photographing device. In the case in which point cloud position data is obtained by laser scanning device, data concerning light intensity of reflected light from each point is obtained. Therefore, by handling the point cloud position data as an image data constructing image of the object, the image of the object to be measured can be duplicated based on the point cloud position data. Therefore, an image of an object to be measured can be obtained based on a means for obtaining point cloud position data, instead of photographing means such as CCD, CMOS image sensor or the like.

The invention according to claim 3, according to the invention recited in claim 1 or 2, further has a coordinate integrating unit integrating coordinates of point cloud position data obtained from the primary viewpoint and point cloud position data obtained from the secondary viewpoint depending on the correspondence relationship identified in the corresponding relationship identifying unit. According to the invention as recited in claim 3, a coordinate system of the point cloud position data obtained from the primary viewpoint and coordinate system of point cloud position data obtained from the secondary viewpoint are integrated, and a three-dimensional model depending on the point cloud position data of two clouds obtained from these two viewpoints is calculated. In this way, a part which is in occlusion from the primary viewpoint and is not in occlusion from the secondary viewpoint and another part which is not in occlusion from the primary viewpoint and is in occlusion from the secondary viewpoint, are mutually complemented, thereby providing a three-dimensional model in which occlusion is reduced. Since the occlusion part is reduced when this three-dimensional model is displayed while being rotated, a three-dimensional model in which actual three-dimensional structure of the object to be measured is truly duplicated may be provided.

In the invention according to claim 4, according to the invention recited in claim 3, the three-dimensional model display controlling unit controls displaying of three-dimensional model based on the point cloud position data obtained from the primary viewpoint and the point cloud position data obtained from the secondary viewpoint, in a common coordinate system integrated in the coordinate integrating unit. According to the invention as recited in claim 4, the three-dimensional model of the object seen from the secondary viewpoint is displayed as an image. Since this three-dimensional model is made based on the point cloud position data from different viewpoints, the occlusion part is reduced, and the three-dimensional model image duplicates the actual three-dimensional structure of the object to be measured more accurately.

The invention according to claim 5, according to the invention recited in one of claims 1 to 4, further has an occlusion detecting unit for detecting an occlusion part based on at least the point cloud position data obtained from the primary viewpoint, wherein the three-dimensional model forming unit processes embedding the occlusion part detected in the occlusion detecting unit in the three-dimensional model. According to the invention as recited in claim 5, the occlusion part is visualized and displayed (for example, displayed as a black part) when a viewpoint is changed. In this way, an operator can easily understand the occlusion part visually.

The invention according to claim 6, according to the invention recited in claim 5, further has a new viewpoint position calculating unit calculating position of a new viewpoint from which point cloud position data of the occlusion part can be obtained.

The invention according to claim 7, according to the invention recited in one of claims 1 to 6, further has a guide display controlling unit for controlling guide display of an area to be measured which requires additional obtaining, on a display screen of the three-dimensional model.

The invention according to claim 8, according to the invention recited in one of claims 1 to 7, further has a GPS device measuring position of the primary viewpoint and a position of the secondary viewpoint, wherein the correspondence relationship identifying unit uses the position data measured in the GPS device in order to identify the position of the primary viewpoint and the position of the secondary viewpoint.

In the invention according to claim 9, the present invention provides a point cloud position data processing system comprising: a point cloud position data obtaining means for obtaining point cloud position data of an object to be measured, an image data obtaining means for obtaining image data of the object, a correspondence relationship identifying means in which correspondence relationship between point cloud position data obtained in the point cloud position data obtaining means through a primary viewpoint or image data obtained in the image data obtaining means through the primary viewpoint and image data obtained in the image data obtaining unit through a secondary viewpoint that is different from the primary viewpoint are identified, a three-dimensional model forming means forming a three-dimensional model by the point cloud position data obtained in the point cloud position data obtaining means, and a three-dimensional model display controlling means for controlling displaying of the three-dimensional model formed in the three-dimensional model forming means on an image displaying device, in which the three-dimensional model forming means forms a three-dimensional model having a direction seen from the secondary viewpoint, depending on the correspondence relationship identified in the correspondence relationship identifying means.

In the invention according to claim 10, the present invention provides a point cloud position data processing method comprising: a step of identifying a correspondence relationship in which a correspondence relationship between point cloud position data obtained in the point cloud position data obtaining unit through a primary viewpoint or image data obtained in the image data obtaining unit through the primary viewpoint and image data obtained in the image data obtaining unit through a secondary viewpoint that is different from the primary viewpoint are identified, a step of forming a three-dimensional model forming a three-dimensional model based on the point cloud position data of the object obtained in the primary viewpoint, and a step of controlling a three-dimensional model display controlling for displaying the three-dimensional model on an image displaying device, in which the three-dimensional model forming step forms three-dimensional model having a direction seen from the secondary viewpoint, depending on the correspondence relationship identified in the correspondence relationship identifying step.

In the invention according to claim 11, the present invention provides a point cloud position data processing program which is read and run by a computer, the program actuating the computer as a following means: a point cloud position data obtaining unit obtaining point cloud position data of an object to be measured, an image data obtaining unit obtaining image data of the object, a correspondence relationship identifying unit in which correspondence relationship between point cloud position data obtained in the point cloud position data obtaining unit through a primary viewpoint or image data obtained in the image data obtaining unit through the primary viewpoint and image data obtained in the image data obtaining unit through a secondary viewpoint which is different from the primary viewpoint are identified, a three-dimensional model forming unit for forming a three-dimensional model by the point cloud position data obtained in the point cloud position data obtaining unit, and a three-dimensional model display controlling unit for controlling displaying of the three-dimensional model formed in the three-dimensional model forming unit on an image displaying device, in which the three-dimensional model forming unit forms a three-dimensional model having direction seen from the secondary viewpoint, depending on the correspondence relationship identified in the correspondence relationship identifying unit.

According to the invention as recited in claim 1, a technique is provided to an operator, in which information to decide a new position of a viewpoint for solving for occlusion is provided.

According to the invention as recited in claim 2, based on the image data obtained from the means for obtaining the point cloud position data, information is generated, which is for decision of a new viewpoint position for solving for the occlusion.

According to the invention as recited in claim 3, a three-dimensional model is obtained, in which occlusion is solved.

According to the invention as recited in claim 4, the three-dimensional model image is displayed, in which occlusion is solved.

According to the invention as recited in claim 5, an operator recognizes the occlusion part more precisely.

According to the invention as recited in claim 6, a new viewpoint in which occlusion can be solved is suggested to an operator.

According to the invention as recited in claim 7, an operator can know a region in which data runs short for forming a three-dimensional model.

According to the invention as recited in claim 8, positions of the primary viewpoint and the secondary viewpoint can be identified using GPS.

According to the invention as recited in claim 9, a system is provided, in which information for decision of a new viewpoint position solving the occlusion is provided to an operator.

According to the invention as recited in claim 10, a method is provided, in which information for a decision of a new viewpoint position for solving the occlusion is provided to an operator.

According to the invention as recited in claim 11, a program is provided, in which information for decision of a new viewpoint position solving the occlusion is provided to an operator.

DETAILED DESCRIPTION OF THE PREFERRED EMBODIMENTS

1. First Embodiment

Figure 1:
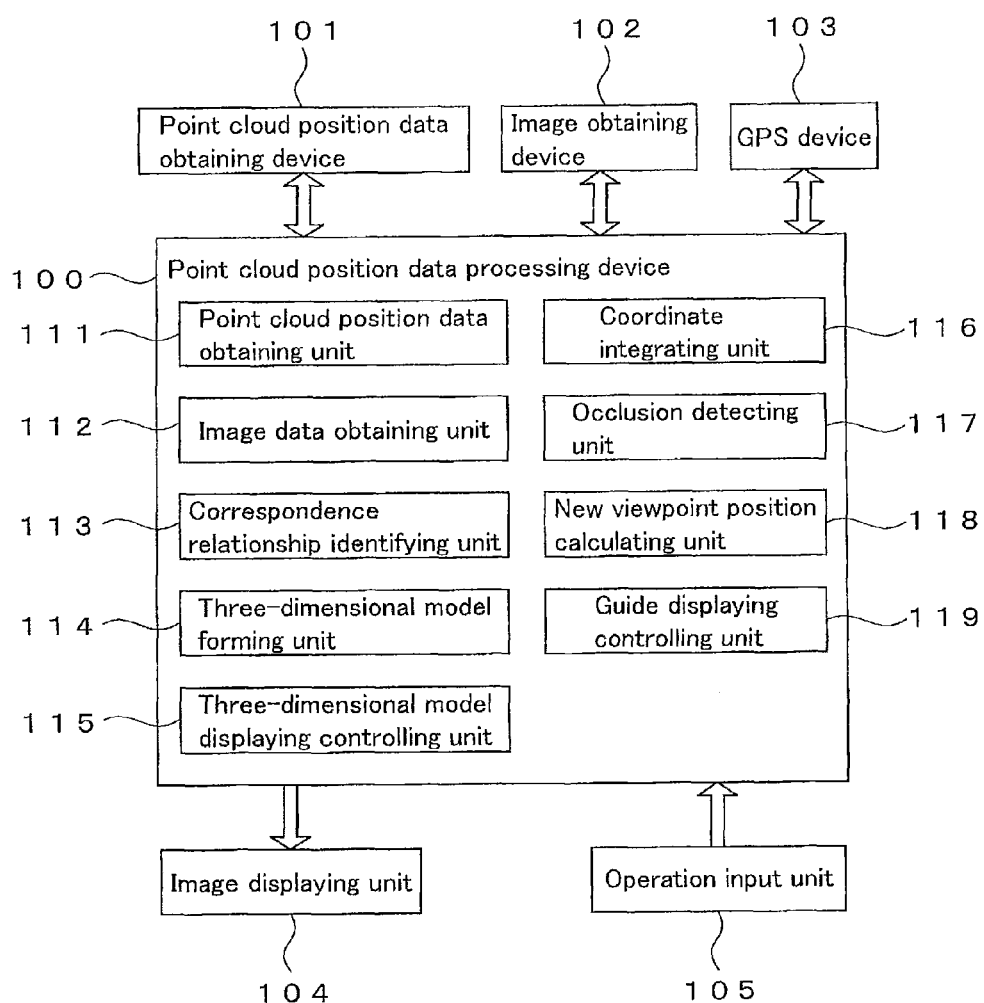
FIG. 1 is a block diagram of an Embodiment.

An example of a point cloud position data processing device will be described with reference to figures hereinafter. FIG. 1 shows a point cloud position data processing device 100. The point cloud position data processing device 100 is constructed software-like in a personal computer. The software which constructs the point cloud position data processing device 100 in the personal computer is installed in the personal computer. It should be noted that this program can be stored in a server or an appropriate recording medium and can be provided therefrom.

The personal computer used includes an input unit such as a keyboard, touch panel display or the like, a display unit such as liquid crystal display or the like, a GUI (graphical user interface) function unit in which the input unit and the display unit are integrated, an operating device such as a CPU or the like, a semiconductor memory, a hard disk recording unit, a disk recording device driving unit in which information can be handled with the recording medium such as optical disk or the like, an interface unit in which information can be handled with a portable recording medium such as a USB memory or the like, and a communication interface unit in which wireless or wired communication is performed. It should be noted that a configuration such as of the notebook type, portable type and desktop type may be mentioned; however, the configuration of the present invention is not limited in particular. In addition to using a general personal computer, the point cloud position data processing device 100 can be constructed by dedicated hardware which is constructed by using PLD (Programmable Logic Device) or the like such as ASIC (Application Specific Integrated Circuit) or FPGA (Field Programmable Gate Array).

A point cloud position data obtaining device 101, an image obtaining device 102, GPS (Global Positioning System) device 103, an image displaying device 104, and an operating input device 105 are connected to the point cloud position data processing device 100. The point cloud position data obtaining device 101 is a laser scanner, as explained below. The point cloud position data obtaining device 101 emits laser light on an object to be measured, and point cloud position data is obtained by detecting reflected light thereof. The image obtaining device 102 is a photographing device in which a CCD or CMOS image sensor is used. The image obtaining device 102 takes a photo of a surface appearance image of the object to be measured, which is an object to obtain point cloud position data, and obtains its image data.

The GPS device 103 is a position detecting device used in a navigation system or the like. The GPS device 103 receives a GPS signal and obtains position data based on the signal. The image displaying device 104 is a display (for example, a liquid crystal display) of the personal computer forming the point cloud position data processing device 100. The operation input device 105 is an operating input device (keyboard, pointing device such as mouse input device or the like) that forms the point cloud position data processing device 100. The operating input device 105 cooperatively functions with the image displaying device 104, thereby enabling operating the point cloud position data processing device 100 using a conventional GUI (Graphical User Interface).

The point cloud position data processing device 100 includes a point cloud position data obtaining unit 111, an image data obtaining unit 112, a correspondence relationship identifying unit 113, a three-dimensional model forming unit 114, a three-dimensional model displaying controlling unit 115, a coordinate integrating unit 116, an occlusion detecting unit 117, a new viewpoint position calculating unit 118, and a guide displaying controlling unit 119.

The point cloud position data obtaining unit 111 receives point cloud position data output from the point cloud position data obtaining device 101 and takes it in the point cloud position data obtaining device 100. The image data obtaining unit 112 receives image data output from the image obtaining device 102 and takes it in the point cloud position data obtaining device 100. The correspondence relationship identifying unit 113 processes identifying correspondence relationship between point cloud position data of an object to be measured obtained in a primary viewpoint (or image data obtained by photographing the object to be measured in the primary viewpoint) and image data obtained in a secondary viewpoint that is different from the primary viewpoint. It should be noted that details of functions of the correspondence relationship identifying unit 113 will be described later. The three-dimensional model forming unit 114 forms a three-dimensional model based on the point cloud position data obtained by the point cloud position data obtaining unit 111. Details of function of the three-dimensional model forming unit 114 will be described later.

The three-dimensional model herein is a figure in which three-dimensional structure of the object to be measured is visualized with expressing a profile line of the object as a line figure. The profile line means a line forming an outer shape of the object to be measured (outline), which is required to understand surface appearance of the object to be measured visually. Practically, a curved part and a part where curvature is radically decreased correspond to the profile line. The profile line is not only for a part of an outer shape but also for an edge part defining a convex part and an edge part defining a concave part (for example, a part of groove structure). So-called line figures can be obtained by the profile line, and an image displaying can be performed, in which an outer appearance of the object is easily understood.

The three-dimensional model displaying controlling unit 115 controls for displaying the three-dimensional model of the object to be measured on the image displaying device 104. This three-dimensional model includes a three-dimensional model based on point cloud position data obtained from the primary viewpoint, and a three-dimensional model which is formed based on point cloud position data obtained from the primary viewpoint and point cloud position data obtained from the secondary viewpoint. The coordinate integrating unit 116 performs operations to obtain a common coordinate system (integrated coordinate system) to handle a primary point cloud position data of the object to be measured which is obtained by placing the point cloud position data obtaining device 101 at the primary viewpoint position, and a secondary point cloud position data of the object which is obtained by placing the point cloud position data obtaining device 101 at the secondary viewpoint position that is different from the primary viewpoint position. This operation is performed based on the mutual correspondence relationships of the images obtained from two viewpoints identified in the correspondence relationship identifying unit 113. Details of functions of the coordinate integrating unit 116 will be described later.

The occlusion detecting unit 117 detects a part that should be detected as the occlusion. Details of function of the occlusion detecting unit 117 will be described later. The new viewpoint position calculating unit 118 displays a new viewpoint from which the occlusion can be solved (or reduced more), on a screen on which the three-dimensional model is displayed. Details of function of the new viewpoint position calculating unit 118 will be described later. The guide displaying controlling unit 119 displays a region which requires obtaining point cloud position data again regarding accuracy and error, on the image displaying device 104 together with the three-dimensional model.

Figure 2:
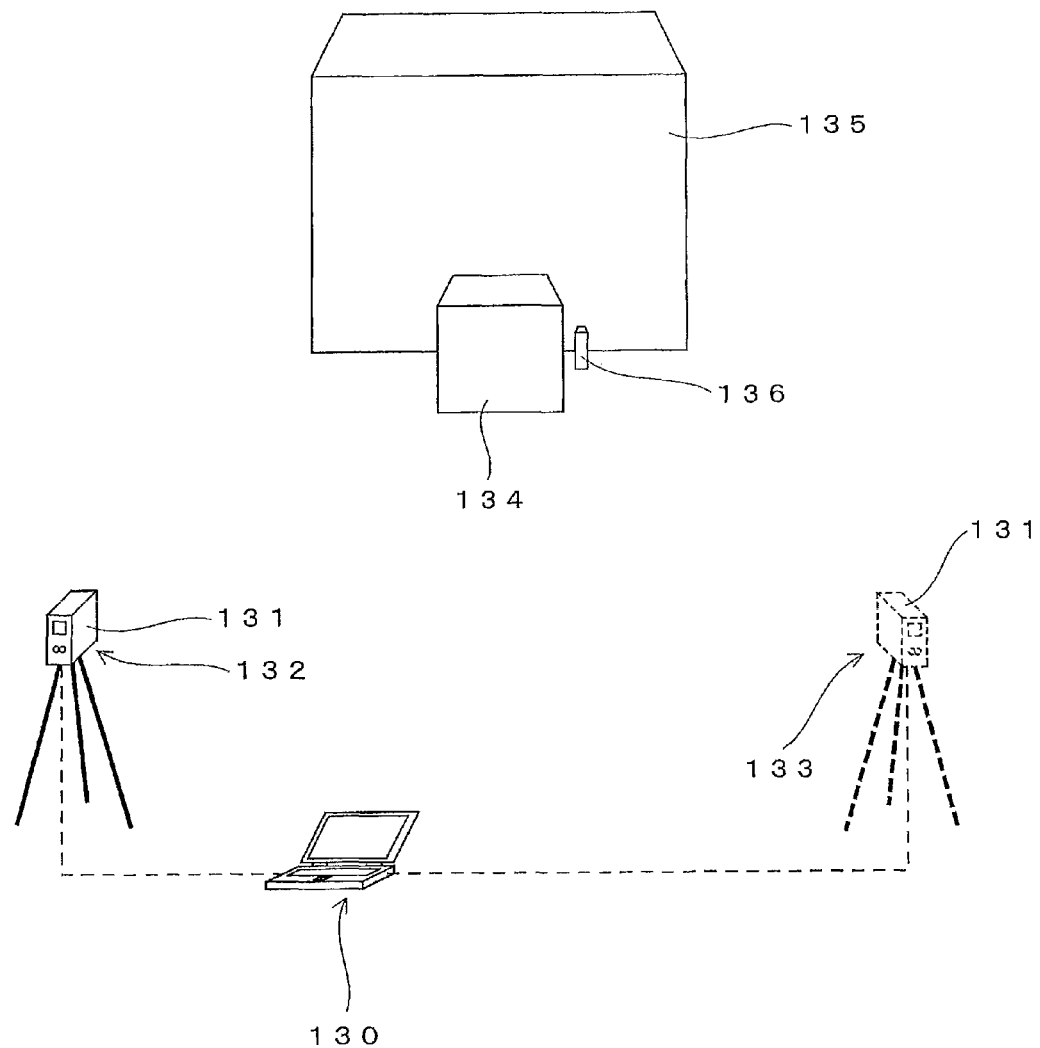
FIG. 2 is a conceptual diagram showing a situation of measuring.

Hereinafter the correspondence relationship identifying unit 113, the coordinate integrating unit 116, the occlusion detecting unit 117, and the new viewpoint position calculating unit 118 are explained in detail. First, a practical example of conditions of measuring point cloud position data, which is a premise of the explanation, is explained here. FIG. 2 conceptually shows an example of a situation for measuring the point cloud position data. FIG. 2 shows a notebook type personal computer 130 which functions as the point cloud position data processing device 100 in FIG. 1. A three-dimensional laser scanner 131, which is an example of the point cloud position data obtaining device, is connected to the personal computer 130. FIG. 2 shows an example in the case in which the three-dimensional laser scanner 131 is first placed at a primary placing position 132, which is the primary viewpoint of measuring to obtain point cloud position data, and the three-dimensional laser scanner 131 is next placed at a secondary placing position 133 which is the secondary viewpoint of measuring to obtain point cloud position data again. It should be noted that the three-dimensional laser scanner 131 includes functions of the image obtaining device 102 and the GPS device 103 in addition to function of the point cloud position data obtaining device 101 of FIG. 1.

FIG. 2 shows a situation in which an object to be measured 134 is positioned in front and an object to be measured 135 is positioned back of the object 134 if seen from the three-dimensional laser scanner side, in the situation in which the three-dimensional laser scanner 131 is placed at the primary placing position 132. In addition, FIG. 2 also shows a situation in which an object to be measured 136 is positioned behind the object 134 seen from the primary placing position 132.

(Correspondence Relationship Identifying Unit)

Hereinafter the correspondence relationship identifying unit 113 of FIG. 1 is explained. Here, as a practical example, a function of the correspondence relationship identifying unit 113 in the situation of FIG. 2 is explained. In this case, the correspondence relationship identifying unit 113 identifies a correspondence relationship (co-relationship) between the point cloud position data (or the image data) of the objects to be measured 134 to 136 obtained in the case in which the three-dimensional laser scanner 131 is arranged at the primary placing position 132 (the primary viewpoint), and the image data of the objects to be measured 134 to 136 obtained in the case in which the three-dimensional laser scanner 131 is arranged at the secondary placing position 133 (the secondary viewpoint).

As a method to identify the above correspondence relationship, "single photograph orientation", "mutual orientation", and "stereo matching" can be mentioned. One of these methods, or combination thereof, can be employed. A process to identify the above correspondence relationship can be understood as a process identifying a correspondence relationship between a coordinate system (primary coordinate system, X, Y, Z) used for handling image data of image obtained in the case in which the objects to be measured 134 to 136 are seen from the primary placing position (the primary viewpoint) 132, and a coordinate system (secondary coordinate system, x, y, z) used for handling image data of image obtained in the case in which the objects to be measured 134 to 136 are seen from the secondary placing position (the secondary viewpoint) 133 in FIG. 2.

Here, in the case in which the single photograph orientation is used, a process to calculate the above correspondence relationship is performed, based on the point cloud position data already obtained in the primary viewpoint and the image data obtained by photographed from the secondary viewpoint. In the case in which the mutual orientation and the stereo matching are used, a process to calculate the above correspondence relationship is performed, based on the image data obtained by photographed from the primary viewpoint and the image data obtained by photographed from the secondary viewpoint. It should be noted that the image data of the image obtained from the primary viewpoint can be image data of image photographed by a photographing device such as a CCD camera, or image data obtained based on point cloud position data.

Single Photograph Orientation

The single photograph orientation is a technology in which a position (X0, Y0, Z0) and an inclination ($\omega$, $\phi$, $\kappa$) of a camera which is used for taking a photograph, are calculated by using collinearity conditions formed on a reference point in the photograph, and the relationship between photograph coordinate x, y and ground coordinate X, Y, Z are obtained. The collinearity condition is a condition in which a projection center, a photographic image, and an object on the ground are on one straight line. The position (X0, Y0, Z0) of the camera and the inclination ($\omega$, $\phi$, $\kappa$) of the camera are exterior orientation parameters.

Here, a method for obtaining the relationship between a first coordinate system when objects 134 to 136 are viewed from a first location 132 (primary viewpoint) and a second coordinate system when objects 134 to 136 are viewed from a second location 133 (secondary viewpoint) is explained using the principle of the simple photograph orientation. In this case, the image is obtained from the second location 133 by an image obtaining device 102 (CCD camera) with a three-dimensional laser scanner 131, in a condition in which the point cloud position data of the objects 134 to 136 is obtained in the first location, and then, the following calculation is carried out.

First, the first coordinate system is assumed to be (X, Y, Z) and the second coordinate system is assumed to be (x, y, z), and in the second location 133, it is assumed that photographs are taken by turning the image obtaining device 102 to the left by $\kappa$, $\phi$, $\omega$ with respect to the positive direction in each coordinate axis in series.

Here, four common points of the point cloud position data obtained in the first location 132 and the images photographed from the second location 133 are selected. These four points are common coordinate points which are a foothold for searching for the correspondence of two coordinate systems, and part of the object which is a feature point is selected. As a method for selecting these four points, a method for selecting by manual operation, or a method for automatically extracting a part grasped as a feature point such as an edge or a corner of the object, etc., by software, can be used.

Next, three-dimensional coordinates of reference points corresponding to 4 image coordinates are substituted for a second degree perspective projection formula which is represented by Formula 1, and observation equations are made, and thereby parameters b1 to b8 are calculated.

$$X=(b1 \cdot x+b2 \cdot y+b3)/(b7 \cdot x+b8 \cdot y+1)$$

$$Y=(b4 \cdot x+b5 \cdot y+b6)/(b7 \cdot x+b8 \cdot y+1) \quad \text{Formula 1}$$

By using the parameters b1 to b8 in the Formula 1, exterior orientation parameters (X0, Y0, Z0) are calculated from the following Formula 2.

$$\omega=\tan^{-1}(C \cdot b8)$$

$$\phi=\tan^{-1}(-C \cdot b7 \cos \omega)$$

$$\kappa=\tan^{-1}(-b4/b1)(\phi=0)$$

$$\kappa=\tan^{-1}(-b2/b5)(\phi \neq 0, \omega=0)$$

$$\kappa=\tan^{-1}\{-(A1 \cdot A3-A2 \cdot A4)/(A1 \cdot A2-A3 \cdot A4)\}(\phi \neq 0, \omega \neq 0)$$

$$Z_0=C \cdot \cos \omega\{(A2^2+A3^2)/(A1^2 \cdot A4^2)\}^{1/2}+Zm$$

$$X_0=b3-(\tan \omega \cdot \sin \kappa/\cos \phi - \tan \phi \cdot \cos \kappa) \times (Zm-Z_0)$$

$$Y_0=b6-(\tan \omega \cdot \cos \kappa/\cos \phi - \tan \phi \cdot \sin \kappa) \times (Zm-Z_0) \quad \text{Formula 2}$$

Here, $A1=1+\tan^2 \phi$ $A2=B1+B2 \cdot \tan \phi/\sin \omega$ $A3=B4+B5 \cdot \tan \phi/\sin \omega$ $A4=\tan \phi/(\cos \phi \cdot \tan \omega)$ Zm: Average elevation of four reference points (here, four reference points are coordinates on the same plane, so the elevation is assumed to be fixed.)

C: Focal length

Next, the coordinate system (xp, yp, zp) of the inclined image obtaining device 102 corresponding to (X, Y, Z) is calculated using the following Formula 3 based on the principle of the simple photograph orientation. In the Formula 3, the inclination ($\omega$, $\phi$, $\kappa$) of the image obtaining device that is calculated in the Formula 2 is substituted, and parameters a11 to a33 is obtained by calculating a rotation matrix.

$$\begin{pmatrix} xp \\ yp \\ zp \end{pmatrix} =$$

$$\begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} \cos\kappa & -\sin\kappa & 0 \\ \sin\kappa & \cos\kappa & 0 \\ 0 & 0 & 1 \end{pmatrix}$$

$$\begin{pmatrix} X - X0 \\ Y - Y0 \\ Z - Z0 \end{pmatrix} = \begin{pmatrix} a11 & a12 & a13 \\ a21 & a22 & a23 \\ a31 & a32 & a33 \end{pmatrix} \begin{pmatrix} X - X0 \\ Y - Y0 \\ Z - Z0 \end{pmatrix}$$

Formula 3

$X0, Y0, Z0$: Ground coordinates of projected center

The obtained parameters a11 to a33 and the position (X0, Y0, Z0) and (X, Y, Z) of the camera obtained in the Formula 2 are substituted in a collinearity condition formula represented by the following Formula 4 in which a projection center, a photographic image, and an object on the ground are on one straight line, and coordinate (x, y) is calculated. Here, c is picture distance (focal distance), a11 to a33 are inclinations of the image obtaining device 102 represented as an element of 3×3 rotation matrix, and $\Delta x$, $\Delta y$ are orientation correction terms inside of the image obtaining device 102.

$x = -c((a_{11}(X-X_0)+a_{12}(X-X_0)+a_{13}(X-X_0)/(a_{31}(X-X_0)+a_{32}(X-X_0)+a_{33}(X-X_0))+\Delta x$ $y = -c((a_{21}(X-X_0)+a_{22}(X-X_0)+a_{23}(X-X_0)/(a_{31}(X-X_0)+a_{32}(X-X_0)+a_{33}(X-X_0))+\Delta y$ Formula 4

In this manner, the correspondence between the coordinate system (first coordinate system) (X, Y, Z) when the objects 134 to 136 are viewed from the first location (primary viewpoint) 132 in FIG. 2 and the coordinate system (x, y, z) (second coordinate system) when the objects 134 to 136 are viewed from the second location (secondary viewpoint) 133, is calculated. In the above calculation method, the relationship between z and Z is not obtained; however, there is no problem in the above method, since z equals Z when the first location 132 and the second location 133 differ in a location in a horizontal plane.

Relative Orientation

Figure 8:
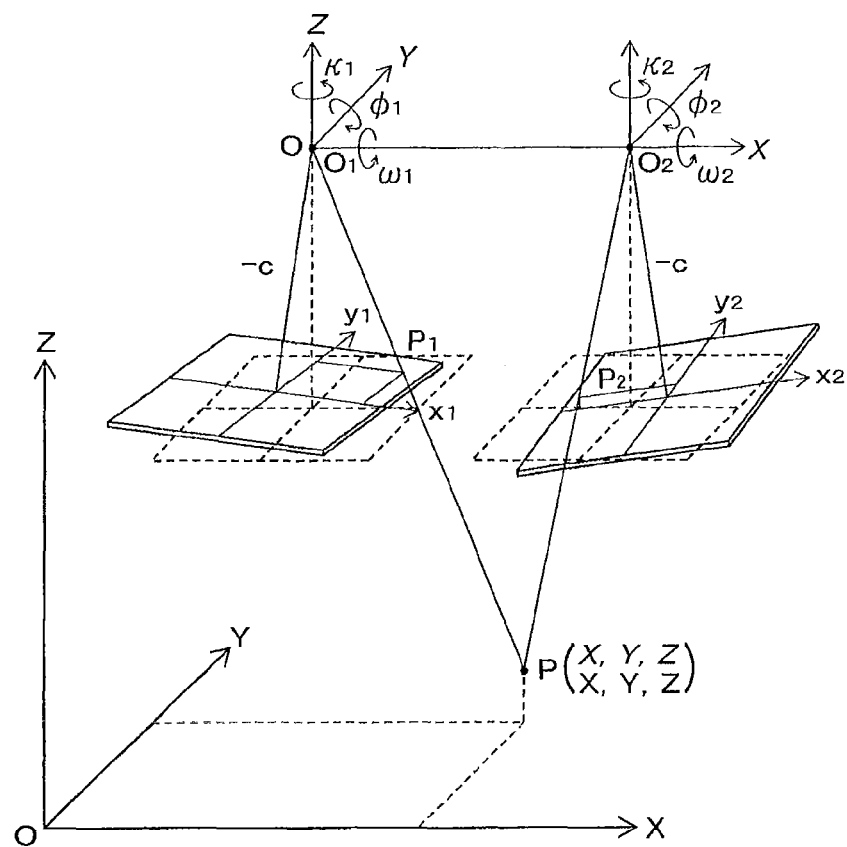
FIG. 8 is a conceptual diagram explaining a principle of mutual orientation.

The relative orientation is a technology in which the relationship between the first coordinate system which indicates the object viewed from the primary viewpoint and the second coordinate system which indicates the object viewed from the secondary viewpoint is obtained by at least six corresponding points in the image. FIG. 8 is an explanatory diagram for explaining a principal of a relative orientation. Here, procedure of the relative orientation is explained by exemplifying the case in which the relationship between the coordinate system (first coordinate system) of the image obtained by photographing from the primary viewpoint (photographing by a left side camera) and the coordinate system (second coordinate system) of the image obtained by photographing from the secondary viewpoint (photographing by a right side camera) is obtained. In the relative orientation, each parameter is obtained by the following coplanar conditional formula.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0$$

Formula 5

$X_{01}, Y_{01}, Z_{01}$: Coordinates of projected center of the left image $X_{02}, Y_{02}, Z_{02}$: Coordinates of projected center of the right image $X_1, Y_1, Z_1$: Left image coordinates $X_2, Y_2, Z_2$: Right image coordinates As shown in FIG. 8, an origin point of a model coordinate system is assumed to be a projection center $O_1$ on the left image, and a line connecting to a projection center $O_2$ on the right image is assumed to be an X-axis. In scale, the length of the baseline is assumed to be a part length. In this case, five parameters are obtained: a rotary angle $\kappa_1$ of the Z-axis and a rotary angle $\phi_1$ of the Y-axis of the left camera, a rotary angle $\kappa_2$ the Z-axis, a rotary angle $\phi_2$ of the Y-axis, and a rotary angle $\omega_2$ of the X-axis of the right camera. Since the rotary angle $\omega_1$ of the X-axis of the left camera is zero, it need not be taken into consideration. Under these conditions, the coplanar conditional formula of the Formula 5 is converted into the Formula 6, and respective parameters are calculated by solving this Formula 6.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_2 = 0$$

Formula 6

$\kappa_1$: Left camera's rotary angle about Z-axis $\phi_1$: Left camera's rotary angle about Y-axis $\kappa_2$: Right camera's rotary angle about Z-axis $\phi_2$: Right camera's rotary angle about Y-axis $\omega_2$: Right camera's rotary angle about X-axis Here, the following relationship for converting coordinates is formed between the model coordinate system XYZ and the camera coordinate system xyz.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} = 0 \quad \text{Formula 7}$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \quad \text{Formula 8}$$

$$\begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Unknown parameters are calculated by using the above-described formula according to the steps described below.

(1) Assume initial approximate values to be zero as a rule.

(2) Expand the coplanar conditional formula of the Formula 6 using Taylor's formula about the approximate values, and make it linear. Calculate the differential coefficients from the Formulas 7 and 8, and make observation formulas.

(3) Calculate correction amount for the approximate values by the least-squares method.

(4) Correct the approximate values.

(5) Use the corrected approximate values, and repeat the steps (2) to (5) until the result converges.

The correspondence between the first coordinate system (X1, Y1, Z1) and the second coordinate system (X2, Y2, Z2) is obtained by obtaining the unknown parameter using the above method.

Absolute Orientation

The absolute orientation is a method for converting a model coordinate system into a ground coordinate system (absolute coordinate system). When the absolute orientation is used, the first coordinate system is related to the ground coordinate system and the second coordinate system is related to the ground coordinate system, and the correspondence between the first coordinate system and the second coordinate system is obtained through the ground coordinate system. First, the model coordinate system (XM, YM, ZM) is converted into the ground coordinate system (X, Y, Z). Here, scale is assumed to be s, rotations around three axes are assumed to be ω, φ, κ, and parallel moved distances are assumed to be (X0, Y0, Z0), and therefore, Formula 9 is obtained.

$$\begin{bmatrix} X \\ Y \\ Z \end{bmatrix} = s \begin{bmatrix} 1 & 0 & 0 \\ 0 & \cos\omega & -\sin\omega \\ 0 & \sin\omega & \cos\omega \end{bmatrix} \begin{bmatrix} \cos\phi & 0 & \sin\phi \\ 0 & 1 & 0 \\ -\sin\phi & 0 & \cos\phi \end{bmatrix} \quad \text{Formula 9}$$

$$\begin{bmatrix} \cos\kappa & -\sin\kappa & 0 \\ \sin\kappa & \cos\kappa & 0 \\ 0 & 0 & 1 \end{bmatrix} \begin{bmatrix} XM \\ YM \\ ZM \end{bmatrix} + \begin{bmatrix} X0 \\ Y0 \\ Z0 \end{bmatrix}$$

Next, ω, φ are assumed to be small, and unknown variables (s, ω, φ, X0, Y0, Z0) are calculated. First, plane coordinates are adjusted by Helmert transformation. When it is limited to plane coordinates, the following Formula 10 is formed. In the Formula 10, cos equals a/s, and sin κ equals −b/s.

$$\begin{bmatrix} X \\ Y \end{bmatrix} = s \begin{bmatrix} \cos\kappa & -\sin\kappa \\ \sin\kappa & \cos\kappa \end{bmatrix} \begin{bmatrix} XM \\ YM \end{bmatrix} + \begin{bmatrix} X0 \\ Y0 \end{bmatrix} \quad \text{Formula 10}$$

$$= \begin{bmatrix} a & b \\ -b & a \end{bmatrix} \begin{bmatrix} XM \\ YM \end{bmatrix} + \begin{bmatrix} X0 \\ Y0 \end{bmatrix}$$

In the above Formula 10, coefficients a, b, X0 and Y0 are decided by a least squares method. Next, the scale is unified. In this case, the following Formula 11 is formed.

$$\begin{bmatrix} XM \\ YM \\ ZM \end{bmatrix}_{new} = \begin{bmatrix} a & b & 0 \\ -b & a & 0 \\ 0 & 0 & \sqrt{a \cdot a + b \cdot b} \end{bmatrix} \begin{bmatrix} XM \\ YM \\ ZM \end{bmatrix}_{old} + \begin{bmatrix} X0 \\ Y0 \\ 0 \end{bmatrix} \quad \text{Formula 11}$$

Next, height is adjusted. In this case, the following Formula 12 is formed.

$$[-XM \quad YM \quad 1] \begin{bmatrix} \omega \\ \phi \\ Z0 \end{bmatrix} = [Z - ZM] \quad \text{Formula 12}$$

In the Formula 12, ω, φ and Z0 are calculated by a least squares method. Then the model coordinate is corrected by the following Formula 13 using the calculated unknown variables.

$$\begin{bmatrix} XM \\ YM \\ ZM \end{bmatrix}_{new} = \begin{bmatrix} 1 & 0 & 0 \\ 0 & \cos\omega & -\sin\omega \\ 0 & \sin\omega & \cos\omega \end{bmatrix} \begin{bmatrix} \cos\phi & 0 & \sin\phi \\ 0 & 1 & 0 \\ -\sin\phi & 0 & \cos\phi \end{bmatrix} \quad \text{Formula 13}$$

$$\begin{bmatrix} XM \\ YM \\ ZM \end{bmatrix}_{old} + \begin{bmatrix} 0 \\ 0 \\ Z0 \end{bmatrix}$$

The correspondence between the model coordinate system (XM, YM, ZM) and the ground coordinate system (X, Y, Z) is obtained by repeating the above processing until the unknown variables are settled. Then, the correspondence between the first coordinate system and the second coordinate system through the ground coordinate system is clarified by selecting the first coordinate system from the primary viewpoint and the second coordinate systems from the secondary viewpoint as a model coordinate system. Alternatively, the image or the point cloud position data from two viewpoints can be handled at the ground coordinate system which is a common coordinate.

Stereo Matching

Figure 9:
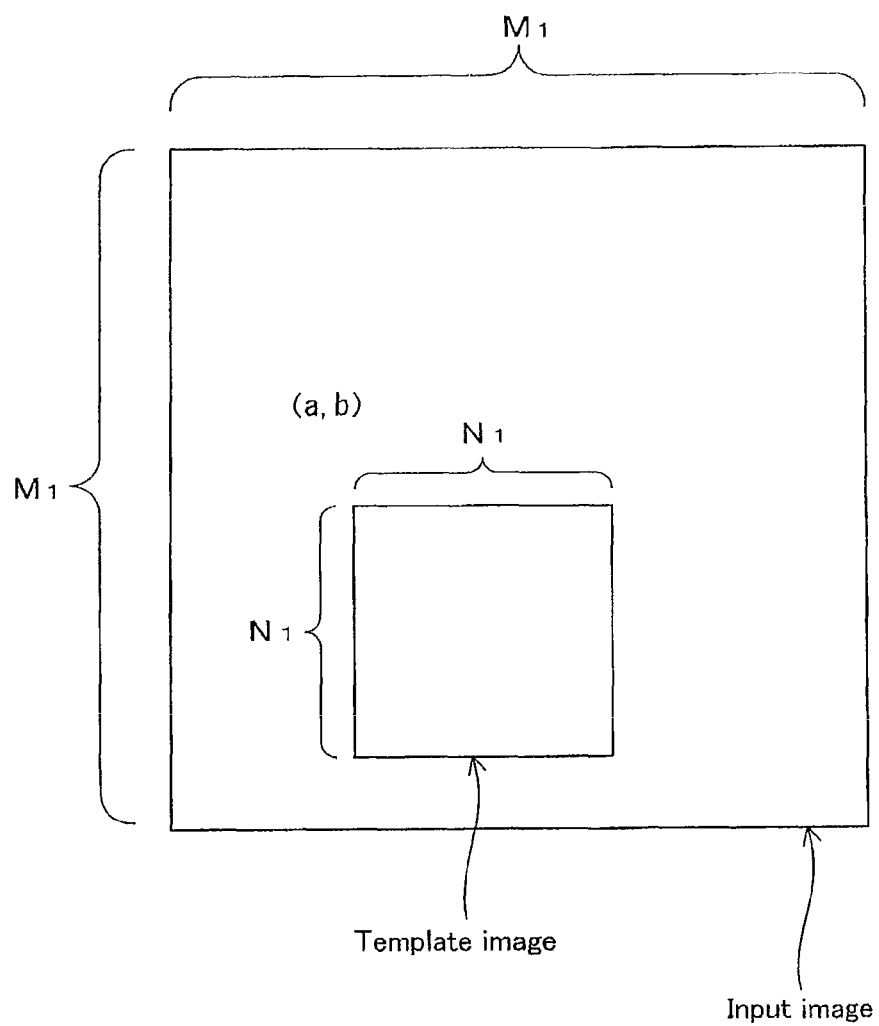
FIG. 9 is a conceptual diagram explaining a principle of stereo matching.

In a method using stereo matching, coordinate data of images in two coordinate systems are mutually compared, and the correspondence of the two coordinate systems is obtained by correlation thereof. FIG. 9 is a principle figure for explaining the principle of stereo matching. In this method, a template image having $N_1 \times N_1$ pixels is moved on a search range $(M_1 - N_1 + 1)^2$ in an input image having $M_1 \times M_1$ pixels which is larger than $N_1 \times N_1$ pixels, as shown in FIG. 9, and a left upper position of the template image is obtained, so that cross correlation function C(a,b) shown in the following Formula 14 is maximum (that is, degree of the correlation is maximum).

$$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma ab} T_\sigma}}$$ Formula 14

Here, $$\bar{I} = \frac{1}{N_1^2} \sum_{m_1=0}^{N_1-1} \sum_{n_1=0}^{N_1-1} I_{(a,b)}(m_1, n_1)$$

$$\bar{T} = \frac{1}{N_1^2} \sum_{m_1=0}^{N_1-1} \sum_{n_1=0}^{N_1-1} T(m_1, n_1)$$

$$I_{\sigma ab} = \frac{1}{N_1^2} \sum_{m_1=0}^{N_1-1} \sum_{n_1=0}^{N_1-1} \{I_{(a,b)}(m_1, n_1) - \bar{T}\}^2$$

$$T_\sigma = \frac{1}{N_1^2} \sum_{m_1=0}^{N_1-1} \sum_{n_1=0}^{N_1-1} \{T(m_1, n_1) - \bar{T}\}^2$$

$I_{(a,b)}(m_1, n_1)$: Local image of input image $T(m_1, n_1)$: Template image

The correspondence between coordinate systems of two images to be compared, can be known by using the stereo matching. That is, the correspondence between the coordinate system (first coordinate system) when the object is viewed from the primary viewpoint and the coordinate system (second coordinate system) when the object is viewed from the secondary viewpoints, can be known.

Three-dimensional Model Forming Unit

Figure 3:
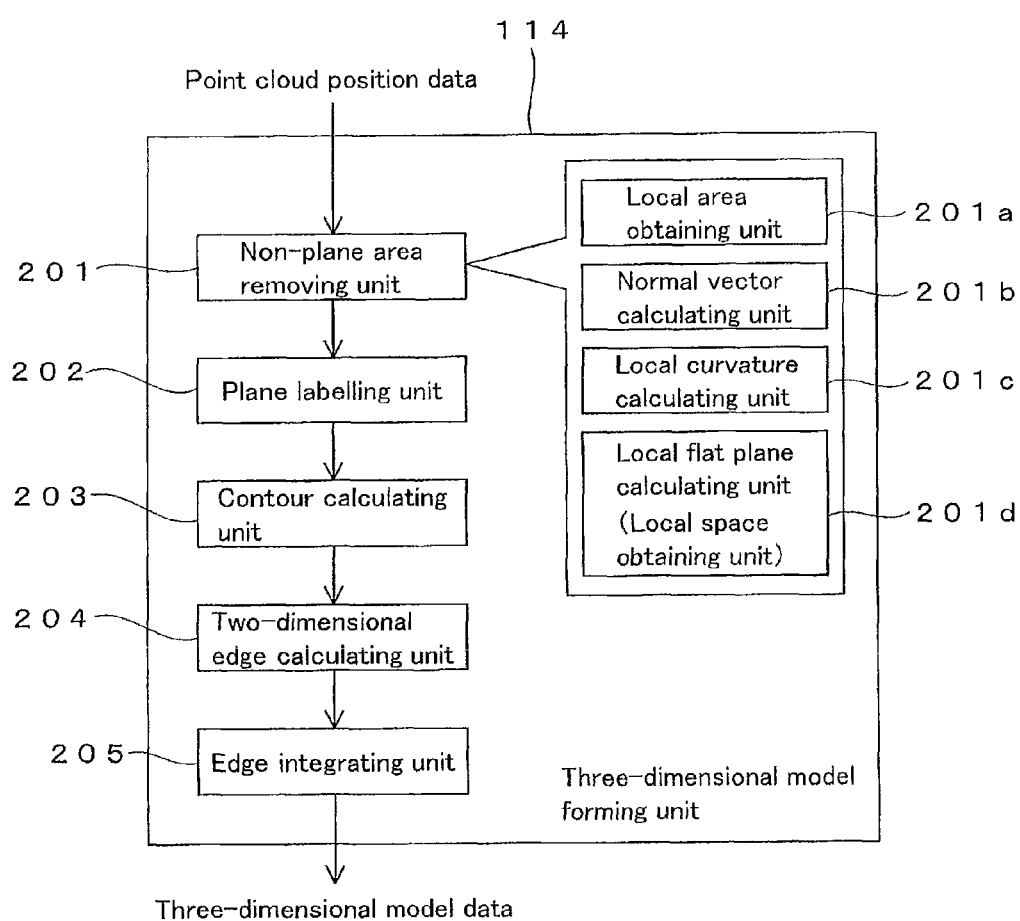
FIG. 3 is a block diagram of a three-dimensional model forming unit in an Embodiment.

In the following, a function of three-dimensional model forming unit 114 shown in FIG. 1 will be explained. FIG. 3 shows a block diagram of the three-dimensional model forming unit 114. The three-dimensional model forming unit 114 is equipped with a non-plane area removing unit 201, a plane labeling unit 202, a contour calculating unit 203, a two-dimensional edge calculatiog unit 204, and an edge integrating unit 205. Each of these function units will be described hereinafter. The non-plane area removing unit 201 includes a local area obtaining unit 201a for obtaining a local area, a normal vector calculating unit 201b for calculating a normal vector of a local area, a local curvature calculating unit 201c for calculating a local curvature of a local area, and a local flat plane calculating unit 201d for a calculating local flat plane which fits to the local area. The local area obtaining unit 201a obtains a square area (grid-like area) of approximately 3 to 7 pixels on a side, which has a target point at the center, as a local area, based on the point cloud position data. The normal vector calculating unit 201b calculates a normal vector of each point in the above local area obtained by the local area obtaining unit 201a. In the calculation of the normal vector, the point cloud position data in the local area is used, and a normal vector of each point is calculated. This calculation is performed on the entirety of the point cloud data. That is, the point cloud data is segmented into numerous local areas, and a normal vector of each point in each of the local areas is calculated.

The local curvature calculating unit 201c calculates a variation (local curvature) of the normal vectors in the local area. In this case, in a target local area, an average (mNVx, mNVy, mNVz) of intensity values (NVx, NVy, NVz) of the three axis components of each normal vector is calculated. In addition, a standard deviation (StdNVx, StdNVy, StdNVz) is calculated. Then, a square-root of a sum of squares of the standard deviation is calculated as a local curvature (crv) (see the following Formula 15).

Local curvature=$(StdNVx^2+StdNVy^2+StdNVz^2)^{1/2}$   Formula 15

The local flat plane calculating unit 201d calculates a local flat plane fitted (approximated) to the local area. In this calculation, an equation of a local flat plane is obtained from three-dimensional coordinates of each point in a target local area. The local flat plane is made so as to fit to the target local area. In this case, the equation of the local flat plane that fits to the target local area is obtained by the least-squares method. Specifically, plural equations of different flat planes are obtained and are compared, whereby the equation of the local flat plane that fits to the target local area is obtained. When the target local area is a flat plane, a local flat plane coincides with the local area.

The calculation is repeated so that it is performed on the entirety of the point cloud position data by sequentially forming a local area, whereby normal vectors, a local flat plane, and a local curvature, of each of the local areas are obtained.

Next, points of non-plane areas are removed based on the normal vectors, the local flat plane, and the local curvature, of each of the local areas. That is, in order to extract planes (flat planes and curved planes), portions (non-plane areas), which can be preliminarily identified as non-planes, are removed. The non-plane areas are areas other than the flat planes and the curved planes, but there may be cases in which curved planes with high curvatures are included according to threshold values of the following methods (1) to (3).

The removal of the non-plane areas is performed by at least one of the following three methods. In this embodiment, evaluations according to the following methods (1) to (3) are performed on all of the local areas. If the local area is identified as a non-plane area by at least one of the three methods, the local area is extracted as a local area that forms a non-plane area. Then, point cloud position data relating to points that form the extracted non-plane area are removed.

(1) Portion with High Local Curvature

The above local curvature is compared with a predetermined threshold value, and a local area having a local curvature that exceeds the threshold value is identified as a non-plane area. The local curvature indicates variation of normal vectors of the target point and surrounding points. Therefore, the local curvature is small with respect to planes (flat planes and curved planes with small curvatures), whereas the local curvature is large with respect to areas other than the planes (non-planes). Accordingly, when the local curvature is greater than the predetermined threshold value, the target local area is identified as a non-plane area.

(2) Fitting Accuracy of Local Flat Plane

Distances between each point in a target local area and a corresponding local flat plane are calculated. When an average of these distances is greater than a predetermined threshold value, the target local area is identified as a non-plane area. That is, when a target local area differs from the shape of a flat plane, and the difference is greater, the distances between each point in the target local area and the corresponding local flat plane are greater. By using this function, degree of non-planarity of a target local area is evaluated.

(3) Check of Coplanarity

The directions of local flat planes that correspond to adjacent local areas are compared. When the difference in the directions of the local flat planes exceeds a threshold value, the adjacent local areas are identified as non-plane areas. Specifically, two local flat planes that fit to two target local areas, respectively, have a normal vector and a connecting vector that connects center points in the local flat planes. When inner products of each of the normal vectors and the connecting vector are zero, both of the local flat planes are determined to exist in the same plane. When the inner products are greater, the two local flat planes are more separated and are not in the same plane.

A local area that is identified as a non-plane area by at least one of the three methods (1) to (3) is extracted as a local area that forms a non-plane area. Then, point cloud position data relating to points that form the extracted local area are removed from point cloud position data to be calculated. As described above, non-plane areas are removed. Thus, point cloud position data of non-plane areas are removed from the point cloud position data by the non-plane area removing unit 201. Since the removed point cloud position data may be used in later steps, these point cloud position data may be stored in an appropriate storage area or may be set so as to be identified from the remaining point cloud position data, in order to make them available later.

Next, function of the plane labeling unit 202 will be described. The plane labeling unit 202 performs plane labeling on the point cloud position data, in which the point cloud position data of the non-plane areas are removed by the non-plane area removing unit 201, based on continuity of normal vectors. Specifically, when an angle difference of normal vectors of a target point and an adjacent point is not more than a predetermined threshold value, identical labels are added to these points. By repeating this processing, identical labels are added to each of connected flat planes and connected curved planes with small curvatures, whereby each of the connected flat planes and the connected curved planes are made identifiable as one plane. After the plane labeling is performed, whether the label (plane) is a flat plane or a curved plane with a small curvature is evaluated by using the angular difference of the normal vectors and standard deviations of the three axial components of the normal vectors. Then, identifying data for identifying the result of this evaluation are linked to each of the labels.

Labels (planes) with small areas are removed as noise. The removal of noise may be performed at the same time as the plane labeling. In this case, while the plane labeling is performed, the number of the identical labels (number of points forming the identical label) is counted, and labels that have points at not more than a predetermined number are cancelled. Then, a label of the nearest plane is added to the points with no label at this time. Accordingly, the labeled planes are extended.

That is, an equation of a labeled plane is obtained, and a distance between the labeled plane and a point with no label is calculated. When there are plural labels (planes) around the point with no label, a label having a smallest distance from the point is selected. If points with no label still exist, each of the threshold values in the removal of non-plane areas, the removal of noise, and the extension of label, is changed, and related processing is performed again. For example, by increasing the threshold value of the local curvature in the removal of non-plane areas, fewer points are extracted as non-planes. In another case, by increasing the threshold value of the distance between the point with no label and the nearest plane in the extension of label, labels are added to more of the points with no label.

When planes have different labels but are in the same planes, the labels of the planes are integrated. That is, identical labels are added to planes that have the same position or the same direction, even if the planes are not continuous planes. Specifically, by comparing the positions and the directions of the normal vectors of each plane, discontinuous same planes are extracted, and the labels thereof are integrated into one of the labels thereof. These are the function of the plane labeling unit 202.

According to the function of the plane labeling unit 202, the amount of data to be dealt with is compacted, whereby the point cloud position data is processed at higher speed. In addition, the amount of necessary memory is decreased. Moreover, point cloud data of passersby and passing vehicles during taking of point cloud position data of an object are removed as noise.

The contour calculating unit 203 calculates (estimates) a contour based on point cloud position data of adjacent planes. A specific calculation method will be described hereinafter. The contour calculating unit 203 obtains line intersection of adjacent planes that hold non-plane areas therebetween, and carries out the processing of it as a contour. At this time, a method in which local flat planes are fitted to the non-plane areas between adjacent planes, multiple local flat planes are connected, and therefore, the non-plane areas are approximated by the multiple local flat planes, can also be used. This is the reason why polyhedron formed by the multiple local flat planes approximates the non-plane area. In this case, the local flat planes are connected from adjacent planes, and line intersection of finally adjacent local flat planes is calculated as a contour. The image of the contour of the object becomes clear by calculating the contour.

Next, the two-dimensional edge calculating unit 204 will be explained. In the following, an example of processing carried out in the two-dimensional edge calculating unit 204 will be explained. First, by a publicly known edge extracting operator such as Laplacian, Prewitt, Sobel, or Canny, provisional edges are extracted from within areas of two-dimensional images corresponding to the planes segmented (divided) based on intensity distribution of light reflected from the object. That is, since the two-dimensional edge is recognized by difference of intensity in plane, the difference of the intensity is extracted from information of the strength of the reflected light, and a contour of the intensity is extracted as a provisional edge by setting a threshold value to the extracting condition. Next, a height (z value) of a three-dimensional coordinate of a point forming the provisional edge is compared with that of a point forming a contour (three-dimensional edge) in the vicinity of the provisional edge. When this difference is not more than a predetermined threshold value, the provisional edge is extracted as a two-dimensional edge. That is, whether the point forming the provisional edge extracted from the two-dimensional image is on the segmented plane or not is evaluated, and when it is on the segmented plane, the provisional edge is a two-dimensional edge.

The contour calculated by the contour calculating unit 203 and the two-dimensional edge calculated by the two-dimensional edge calculating unit 204 are integrated by edge integrating unit 205 after calculating the two- dimensional edge. As described above, the edge based on the point cloud position data is extracted. Line for forming appearance of the object in recognizing the object is extracted by this edge extraction. As a result, chart data of the object are obtained.

As a specific example, for example, the case in which a building is selected as an object and chart data are obtained based on point cloud position data of this building, will be explained. In this case, appearance of the building, pattern of an outer wall, and contour of a window, etc., are expressed as chart data. Here, contours of a part in which roughness is relatively small, such as a window, is processed as a contour or as a two-dimensional edge, by judgment of the threshold value. Such chart data can be used as three-dimensional CAD data or rough sketch data of an object.

When integrated coordinates in which coordinates from two viewpoints are integrated in a coordinate integrating unit, are calculated, the three-dimensional model based on the point cloud position data from two viewpoints is obtained by carrying out formation of the three-dimensional model in a three-dimensional model forming unit 114 as described above on this integrated coordinate. In this case, on a part in which the point cloud position data overlaps at the same coordinate position, the above processing is carried out based on the point cloud position data obtained from one of the viewpoints. Then, on a part in which an occlusion occurs when it is viewed from one viewpoint and an occlusion does not occur when it is viewed from the other viewpoint, the above processing is carried out using the point cloud position data obtained from the other viewpoint. Therefore, for example, a three-dimensional model is formed by complementing point cloud position data obtained from the secondary viewpoint in point cloud position data of a part in which an occlusion occurs when it is viewed from the primary viewpoint.

Coordinate Integrating Unit

Referring to FIG. 1 again, the function of the coordinate integrating unit 116 will be explained. The coordinate integrating unit 116 calculates an integrated coordinate system based on the relationship between two coordinate systems obtained in the correlation identifying unit 113. Generally, the coordinate integrating unit 116 converts one coordinate system to the other coordinate system based on the correspondence between two coordinate systems obtained in the correlation identifying unit 113. As a result, the data of a three-dimensional model handled in one coordinate system can be handled even in the other coordinate system. Alternatively, the point cloud position data handled in both coordinate systems can be handled in one integrated coordinate system.

Occlusion Detecting Unit

Figure 5:
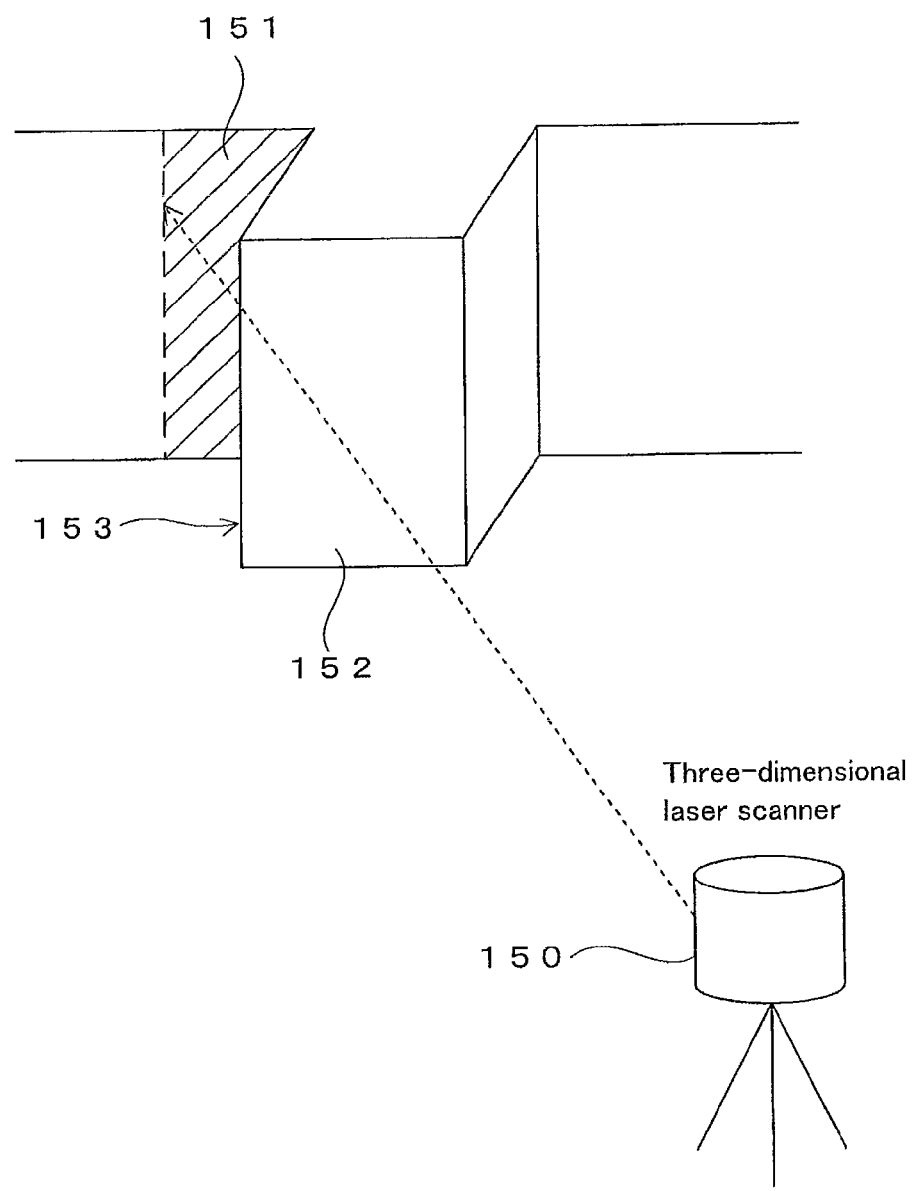
FIG. 5 is a conceptual diagram showing a principle for detecting occlusion.

The occlusion detecting unit 117 detects a part in which occlusion occurs based on fitting accuracy of the local flat plane and check of coplanarity as described above. FIG. 5 is a principle figure for explaining an occurring principle of the occlusion. In FIG. 5, when the object is viewed from a three-dimensional laser scanner 150, a part indicated by reference numeral 151 is a shadow of a front protruded part 152 of the object, and it forms the occlusion part. As is apparent from FIG. 5, in a part in which the occlusion occurs, a part in which direction of plane changes rapidly, such as an edge 153, exists at a front side. Therefore, the part in which the occlusion occurs can be detected by judging whether a front protruded plane exits apart from a base plane and a part in which direction of plane changes rapidly exists at a front side. Specifically, threshold values are set to the above fitting accuracy of the local flat plane and check of coplanarity, and existence of the occlusion is detected by these threshold values. The detection of the occlusion can be also carried out from multiple viewpoints, respectively.

New Viewpoint Position Calculation Unit

Figure 6:
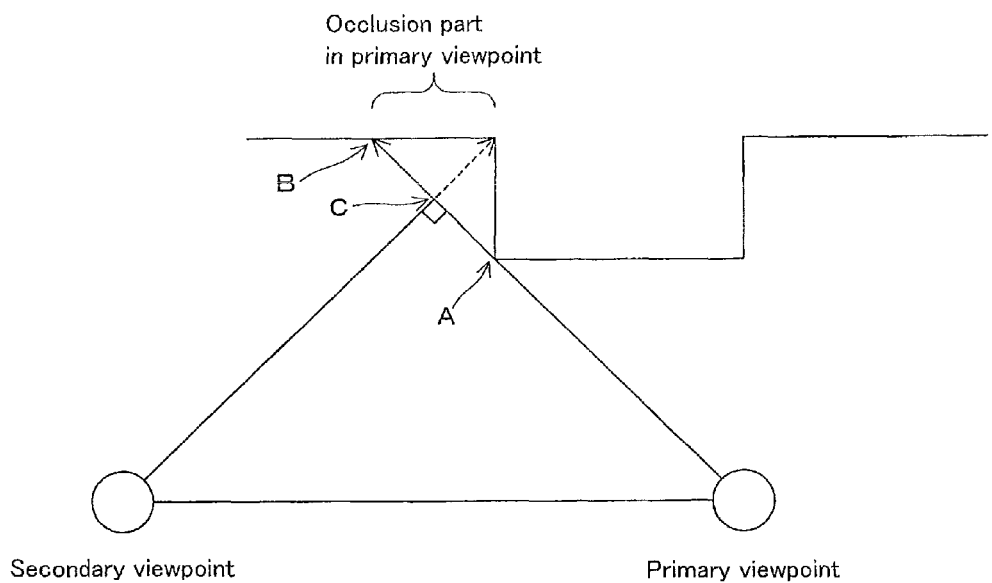
FIG. 6 is a conceptual diagram showing an example of a method for calculating a new viewpoint for solving occlusion.

The new viewpoint position calculation unit 118 calculates a viewpoint in which the occlusion detected by the occlusion detecting unit 117 is solved. FIG. 6 is a principle figure which shows an example of a method for calculating the new viewpoint in which the occlusion is solved. FIG. 6 shows a part that forms the occlusion at a primary viewpoint. In the case of this example, first, a coordinate of position C which is an intermediate point of position A and position B is calculated based on a coordinate of a front edge A in which the occlusion occurs and a coordinate of position B which exists on a back side plane toward a line of sight when it is viewed from a viewpoint 1. Next, one side of an isosceles right triangle is assumed to be a length of from the primary viewpoint to the position C, whereby a coordinate of a secondary viewpoint is calculated. According to this method, new point cloud position data from a direction of a normal vector to a scanning beam can be measured, and the occlusion in the primary viewpoint can be solved.

Figure 4A:
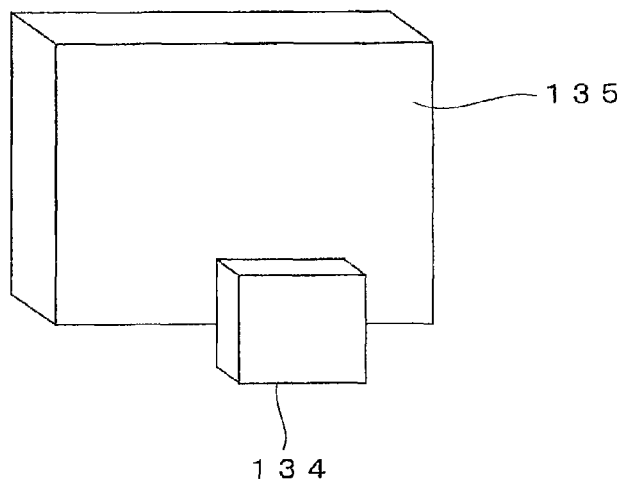
FIG. 4A is an example of three-dimensional model based on point cloud position data obtained from the primary viewpoint.
Figure 4B:
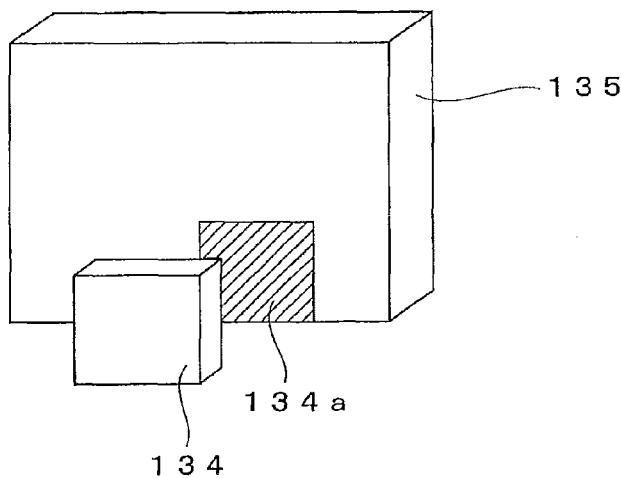
FIG. 4B is a displayed diagram showing a situation of this three-dimensional model seen from the secondary viewpoint.

As a different method for calculating the new viewpoint, the following methods can be also used. When a three-dimensional model based on point cloud position data obtained from one viewpoint (hereinafter primary viewpoint) is rotated as shown in FIG. 4(B), an occlusion part in the point cloud position data appears. Then, a new viewpoint in which the occlusion is solved can be obtained by gradually changing the viewpoint, so that area of an appeared occlusion part is at maximum.

Operation Example 1

In the following, an example of the operation will be explained referring to the case shown in FIG. 2. First, point cloud position data of an illustrated object can be obtained by arranging a three-dimensional laser scanner 131 at a first location 132 (primary viewpoint) in FIG. 2. The three-dimensional model (chart) based on the point cloud position data obtained from this first location 132 (primary viewpoint) in FIG. 2 is shown in FIG. 4(A).

Next, the three-dimensional laser scanner 131 is moved to a second location 133 (secondary viewpoint) in FIG. 2, and the object is photographed by an image obtaining device (CCD camera). Here, in a correlation identifying unit 113, the correspondence between a coordinate system (X, Y, Z) used when image data of an object obtained from the first location 132 are handled, and a coordinate system (x, y, z) used when image data of an object obtained from the second location 133 are handled, is calculated by at least one method as described above. In this way, the three-dimensional model (see FIG. 4(A)) based on the point cloud position data obtained from the first location 132 can be converted to a display state when it is viewed from the second location 133.

FIG. 4(B) shows the three-dimensional model converted to an aspect viewed from the second location 133 by rotating the three-dimensional model based on the point cloud position data obtained in the first location 132. This three-dimensional model image in FIG. 4(B) is shown on a display of a personal computer 130.

FIG. 4(B) shows an occlusion part 134a. Here, the occlusion part 134a is displayed in black on a screen in order to be easily recognized. The occlusion part 134a is part in which a shadow of an object 134 is formed when it is viewed from the first location 132. Since a shadow of the object 134 from the first location 132 is formed and the object 136 in FIG. 2 is not seen, point cloud position data of the occlusion part 134a is not included to the point cloud position data obtained from the first location 132. Therefore, the object 136 is not displayed in the three-dimensional model shown in FIG. 4(B).

Operators can recognize the occlusion part 134a when the point cloud position data are obtained in the first location 132 (primary viewpoint) by observing an image display in FIG. 4(B) on the personal computer 130.

Superiority of Operation Example 1

In a processing for obtaining a display image in FIG. 4(B), photographing from the second location 133 is carried out by a camera, before the point cloud position data is obtained in the second location 133, and the three-dimensional model display as is exemplified in FIG. 4(B) is carried out based on it.

In order to decrease the occlusion part as shown by a reference numeral 134a to the utmost (or in order to prevent necessary part as a figure from coming out by an occlusion part), the point cloud position data are obtained from the second location 133 in addition to the first location 132. Therefore, it is an important operation that quickly allows understanding of how the occlusion part exists and searches for a suitable secondary viewpoint in which the occlusion does not occur by changing the viewpoint.

According to the above method, an occlusion part in the already obtained point cloud position data as shown in FIG. 4(B) can be visually understood by photographing the object from a new viewpoint before the new point cloud position data are obtained. The photographing in this case occupies very short time in comparison to obtaining of the point cloud position data. Therefore, a new viewpoint in which the occlusion does not occur at a necessary part can be quickly searched for.

When a function for displaying as shown in FIG. 4(B) does not exist, the new viewpoint is set by eye measurement or intuition, and then, the point cloud position data is obtained again. In this case, there is a danger that after the point cloud position data is obtained for a sufficient time again and then postprocessing is carried out, it is proven that in fact the occlusion is not solved and the setting of the viewpoint is unsuitable, and re-obtaining of the point cloud position data is required. This causes increase of work for obtaining the point cloud position data. In contrast, according to the present embodiment, the above risk decreases, because the operator can visually understand a degree of solution of the occlusion in the new viewpoint as shown in FIG. 4(B).

Operation Example 2

Figure 7:
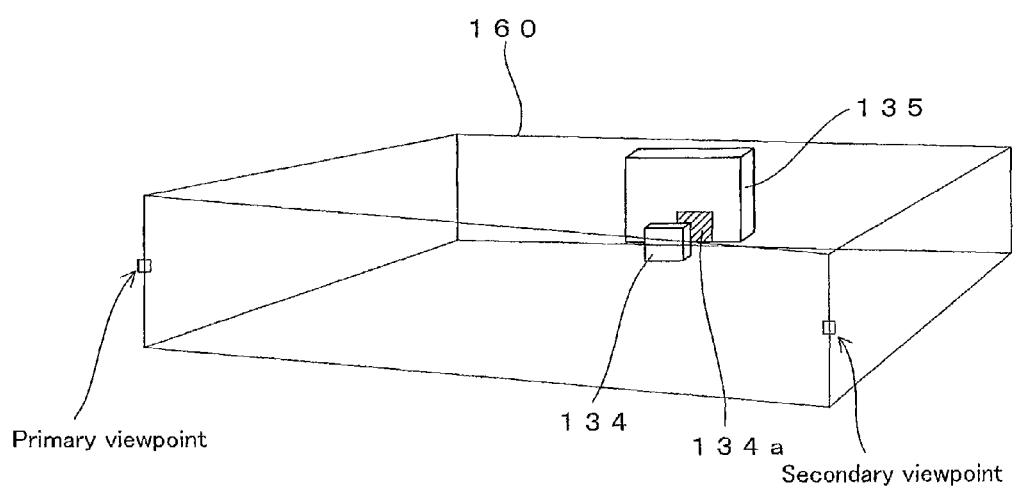
FIG. 7 is a screen display diagram showing an example of a screen display displaying a new viewpoint for solving occlusion.

In the following, an example of an operation for displaying a new viewpoint that solves the occlusion and for guiding the operator, will be explained. FIG. 7 shows an example of a guide display for guiding a position of a new secondary viewpoint which solves the occlusion generated in obtaining the point cloud position data from the primary viewpoint. In FIG. 7, the case shown in FIG. 4 is exemplified. This guide display is displayed, for example, on a display of a personal computer 130 in FIG. 2.

In a display example in FIG. 7, a frame 160 is displayed on a screen in order to easily understand solidity. Then, a primary viewpoint in which the point cloud position data are obtained the last time and a secondary viewpoint in which a part that forms an occlusion in measuring from this primary viewpoint is solved, are displayed on a screen. The position of the secondary viewpoint is calculated in the new viewpoint position calculating unit 118 in FIG. 1. By observing this display, the operator can visually obtain knowledge of the secondary viewpoint in which the occlusion is solved (or more effectively reduced).

Operation Example 3

In the following, an example of a case in which a three-dimensional model is formed based on point cloud position data obtained from the primary viewpoint and point cloud position data obtained from the secondary viewpoint, will be explained based on the case shown in FIG. 2. First, point cloud position data of objects 134 to 136 are obtained at a first setting location 132 (to be exact, point cloud position data of the object 136 cannot be obtained, because the occlusion occurs), and a three-dimensional model of the object is formed (see FIG. 4(A)).

Next, a laser scanner 131 is moved to a second location 133, and images of the objects 134 to 136 are taken. Then, the correspondence between point cloud position data obtained in the first location 132 and image data obtained in the second location 133 is calculated using "the single photograph orientation".

Subsequently, a three-dimensional model display viewed from a viewpoint of the second setting location 133 is obtained based on the point cloud position data obtained in the first location 132 (first point cloud position data) and the correspondence calculated using the above "single photograph orientation" (see FIG. 4(B)). Next, the point cloud position data (second point cloud position data) of the objects 134 to 136 are obtained in the second location 133.

Thereafter, in a coordinate integrating unit 116, an integrated coordinate system which integrates a first coordinate system which handles the first point cloud position data and a second coordinate systems which handles the second point cloud position data, is calculated based on the correspondence calculated using the above "single photograph orientation". Then, a three-dimensional model based on the first point cloud position data and the second point cloud position data is formed by integrally handling the first point cloud position data and the second point cloud position data using the integrated coordinate system.

Figure 4C:
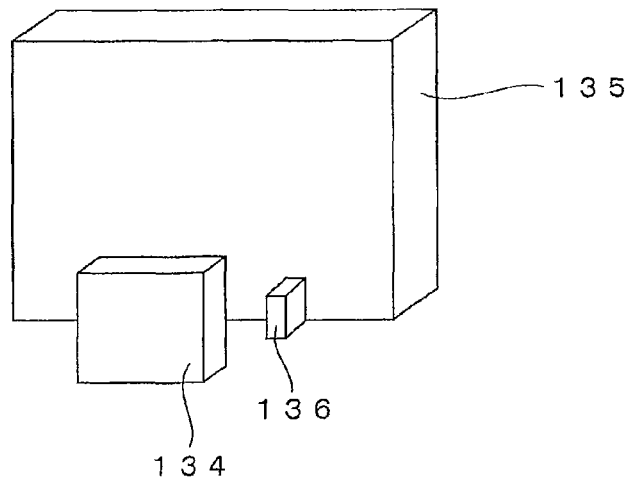
FIG. 4C is a displayed diagram showing a three-dimensional model based on point cloud position data obtained at an integrated coordinate and two viewpoints.

FIG. 4(C) shows an example of a case in which the three-dimensional model based on the first point cloud position data and the second point cloud position data is displayed. In this case, the object 136 does not form an occlusion part, because the three-dimensional model is formed by using point cloud position data obtained in the second location 133 in which the object 136 is observed in FIG. 2. In addition, when the three-dimensional model is rotated around a viewpoint in FIG. 4(A), a part which is a blind spot from the second setting location 133 does not form the occlusion and it is displayed, since the three-dimensional model part based the point cloud position data obtained in the first setting location 132 is observed.

Operation Example 4

By relating coordinate data handled in the inside of a point cloud position data processing unit 100 in FIG. 1 to coordinate data about longitude and latitude obtained by a GPS device 103, position data about a viewpoint for obtaining coordinate or point cloud position data of a three-dimensional model can be related to map data. Whereby, for example, a function in which a position of a new viewpoint for solving an occlusion is displayed on map data displayed on a personal computer, can be carried out.

2. Second Embodiment

A point cloud position data processing device equipped with a three-dimensional laser scanner will be described hereinafter. In this example, the point cloud position data processing device emits distance measuring light (laser light) and scans with respect to an object and measures a distance to each target point on the object therefrom based on flight time of the laser light. Then, the point cloud position data processing device measures the emitted direction (horizontal angle and elevation angle) of the laser light and calculates three-dimensional coordinates of the target point based on the distance and the emitted direction. The point cloud position data processing device takes two-dimensional images (RGB intensity of each of the target points) that are photographs of the object and forms point cloud position data by linking the two-dimensional images and the three-dimensional coordinates. Next, the point cloud position data processing device generates a line figure, which is formed of contours and shows three-dimensional outlines of the object, from the point cloud data. Furthermore, the point cloud position data processing device has a function for executing image display processing for displaying a state of an occlusion unit when it is viewed from the new viewpoint explained in the first embodiment.

Structure

Figure 10:
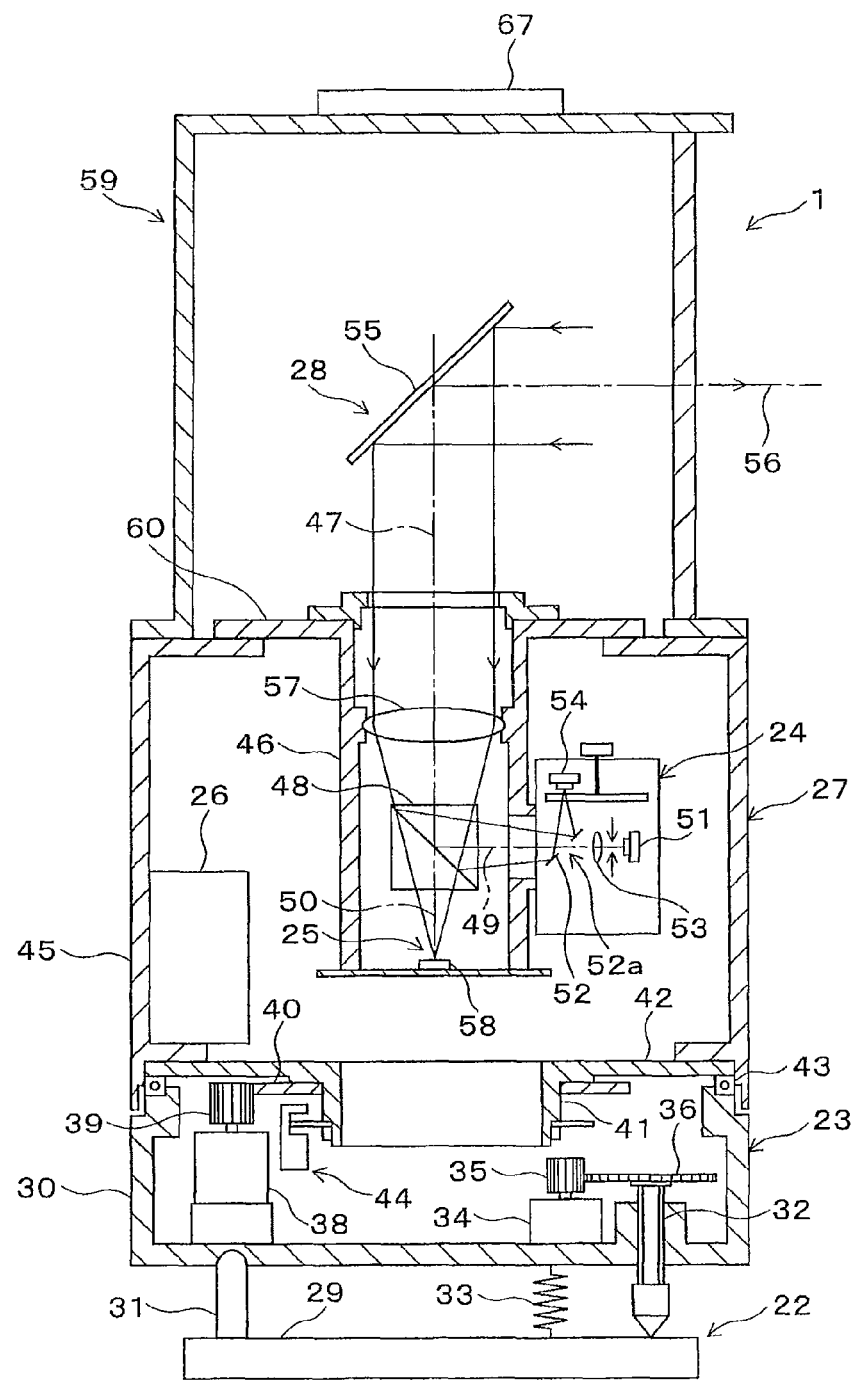
FIG. 10 is a cross-sectional diagram showing a structure of a point cloud position data processing device having a three-dimensional laser scanner function.
Figure 11:
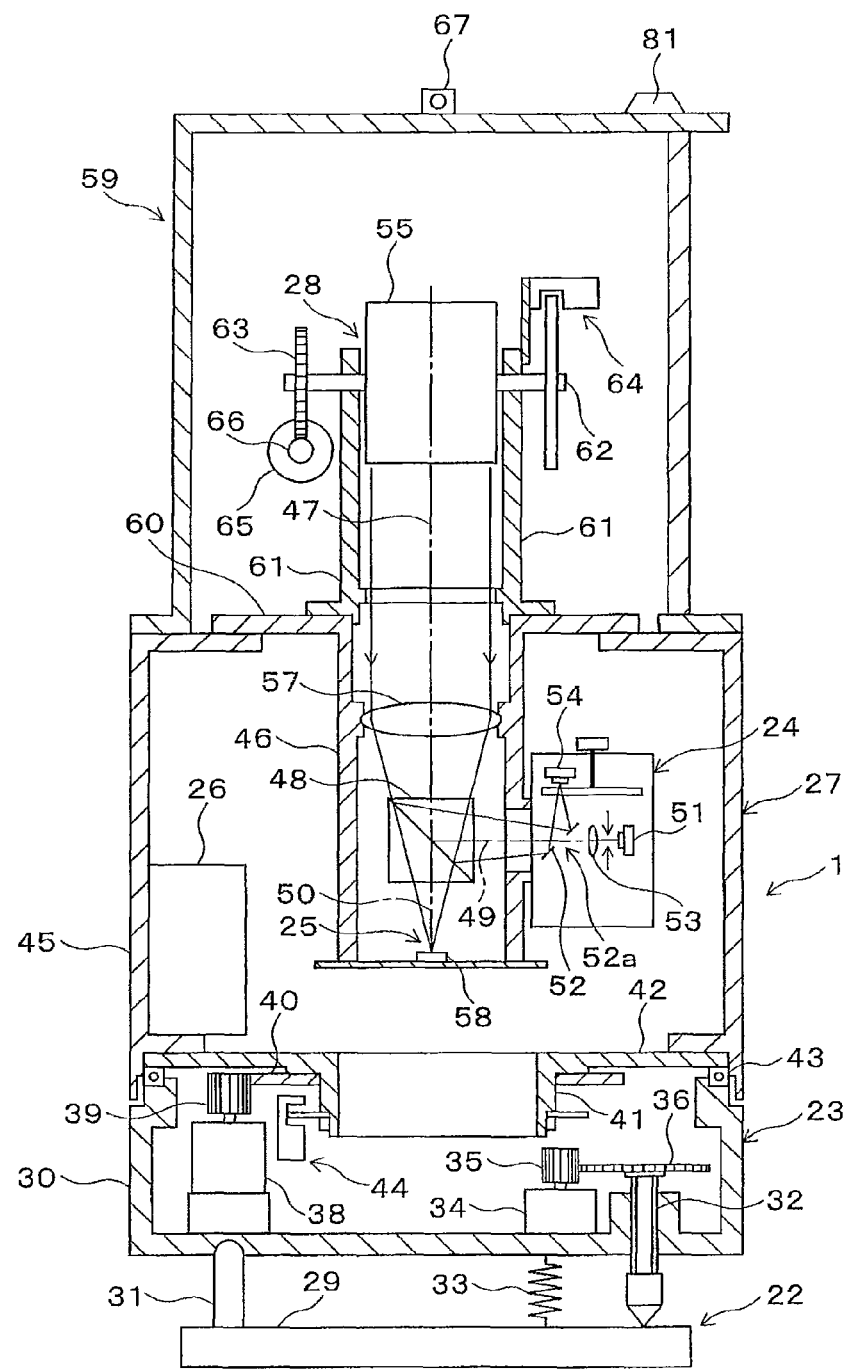
FIG. 11 is a cross-sectional diagram showing a structure of a point cloud position data processing device having a three-dimensional laser scanner function.

FIGS. 10 and 11 are cross sections showing a structure of a point cloud position data processing device 1 equipped with a three-dimensional laser scanner. The point cloud position data processing device 1 is equipped with a level unit 22, a rotational mechanism 23, a main body 27, and a rotationally emitting unit 28. The main body 27 is formed of a distance measuring unit 24, an imaging unit 25, and a controlling unit 26, etc. For convenience of description, FIG. 11 shows the point cloud data processing device 1 in which only the rotationally emitting unit 28 is viewed from a side direction with respect to the cross-section direction shown in FIG. 10.

The level unit 22 has a base plate 29, and the rotational mechanism 23 has a lower casing 30. The lower casing 30 is supported by the base plate 29 with three points of a pin 31 and two adjusting screws 32. The lower casing 30 is tiltable on a fulcrum of a head of the pin 31. An extension spring 33 is provided between the base plate 29 and the lower casing 30 so that they are not separated from each other.

Two level motors 34 are provided inside the lower casing 30. The two level motors 34 are driven independently of each other by the controlling unit 26. By driving the level motors 34, the adjusting screws 32 rotate via a level driving gear 35 and a level driven gear 36, and the downwardly protruded amounts of the adjusting screws 32 are adjusted. Moreover, a tilt sensor 37 (see FIG. 12) is provided inside the lower casing 30. The two level motors 34 are driven by detection signals of the tilt sensor 37, whereby leveling is performed.

The rotational mechanism 23 has a horizontal rotation driving motor 38 inside the lower casing 30. The horizontal rotation driving motor 38 has an output shaft into which a horizontal rotation driving gear 39 is fitted. The horizontal rotation driving gear 39 is engaged with a horizontal rotation gear 40. The horizontal rotation gear 40 is provided to a rotating shaft portion 41. The rotating shaft portion 41 is provided at the center portion of a rotating base 42. The rotating base 42 is provided on the lower casing 30 via a bearing 43.

The rotating shaft portion 41 is provided with, for example, an encoder, as a horizontal angle sensor 44. The horizontal angle sensor 44 measures a relative rotational angle (horizontal angle) of the rotating shaft portion 41 with respect to the lower casing 30. The horizontal angle is input to the controlling unit 26, and the controlling unit 26 controls the horizontal rotation driving motor 38 based on the measured results.

The main body 27 has a main body casing 45. The main body casing 45 is securely fixed to the rotating base 42. A lens tube 46 is provided inside the main body casing 45. The lens tube 46 has a rotation center that is concentric with the rotation center of the main body casing 45. The rotation center of the lens tube 46 corresponds to an optical axis 47. A beam splitter 48 as a means for splitting light flux is provided inside the lens tube 46. The beam splitter 48 transmits visible light and reflects infrared light. The optical axis 47 is split into an optical axis 49 and an optical axis 50 by the beam splitter 48.

The distance measuring unit 24 is provided to the outer peripheral portion of the lens tube 46. The distance measuring unit 24 has a pulse laser light source 51 as a light emitting portion. The pulse laser light source 51 and the beam splitter 48 are provided with a perforated mirror 52 and a beam waist changing optical system 53 therebetween. The beam waist changing optical system 53 changes beam waist diameter of the laser light. The pulse laser light source 51, the beam waist changing optical system 53, and the perforated mirror 52, form a distance measuring light source unit. The perforated mirror 52 introduces the pulse laser light from a hole 52a to the beam splitter 48 and reflects laser light, which is reflected at the object and returns, to a distance measuring-light receiver 54.

The pulse laser light source 51 is controlled by the controlling unit 26 and emits infrared pulse laser light at a predetermined timing accordingly. The infrared pulse laser light is reflected to an elevation adjusting rotating mirror 55 by the beam splitter 48. The elevation adjusting rotating mirror 55 reflects the infrared pulse laser light to the object. The elevation adjusting rotating mirror 55 turns in the elevation direction and thereby converts the optical axis 47 extending in the vertical direction into a floodlight axis 56 in the elevation direction. A focusing lens 57 is arranged between the beam splitter 48 and the elevation adjusting rotating mirror 55 and inside the lens tube 46.

The laser light reflected at the object is guided to the distance measuring-light receiver 54 via the elevation adjusting rotating mirror 55, the focusing lens 57, the beam splitter 48, and the perforated mirror 52. In addition, reference light is also guided to the distance measuring-light receiver 54 through an inner reference light path. Based on a difference between two times, a distance from the point cloud data processing device 1 to the object (target point) is measured. The distance measuring-light receiver 54 is constituted by a photoelectric change element such as a CMOS optical sensor, etc., and it also has a function which detects RGB strength of detected light. [0137] The imaging unit 25 has an image sensor 58 which functions as a camera corresponding to the image information obtaining device 102 in FIG. 1. The image sensor 58 is provided at the bottom of the lens tube 46. The image sensor 58 is formed of a device in which a great number of pixels are flatly assembled and arrayed, for example, a CCD (Charge Coupled Device). The position of each pixel of the image sensor 58 is identified by the optical axis 50. For example, the optical axis 50 may be used as the origin, and an X-Y coordinate is assumed, whereby the pixel is defined as a point on the X-Y coordinate.

The rotationally emitting unit 28 is contained in a floodlight casing 59 in which a part of the circumferential wall is made as a floodlight window. As shown in FIG. 11, the lens tube 46 has a flange portion 60 to which two mirror holding plates 61 are oppositely provided. A rotating shaft 62 is laid between the mirror holding plates 61. The elevation adjusting rotating mirror 55 is fixed to the rotating shaft 62. The rotating shaft 62 has an end into which an elevation gear 63 is fitted. An elevation sensor 64 is provided at the side of the other end of the rotating shaft 62, and it measures rotation angle of the elevation adjusting rotating mirror 55 and outputs the measured results to the controlling unit 26.

One of the mirror holding plates 61 is mounted with an elevation adjusting driving motor 65. The elevation adjusting driving motor 65 has an output shaft into which a driving gear 66 is fitted. The driving gear 66 is engaged with the elevation gear 63 that is mounted to the rotating shaft 62. The elevation adjusting driving motor 65 is controlled by the controlling unit 26 and is thereby appropriately driven based on the results that are measured by the elevation sensor 64.

A bead rear sight 67 is provided on the top of the floodlight casing 59. The bead rear sight 67 is used for approximate collimation with respect to the object. The collimation direction using the bead rear sight 67 is the extending direction of the floodlight axis 56 and is a direction which orthogonally crosses the extending direction of the rotating shaft 62. A GPS antenna 81 has arranged on the top of the floodlight casing 59, as shown in FIG. 11. A GPS information is obtained by the GPS antenna, and it can be used for calculating which is carried out inside.

Figure 12:
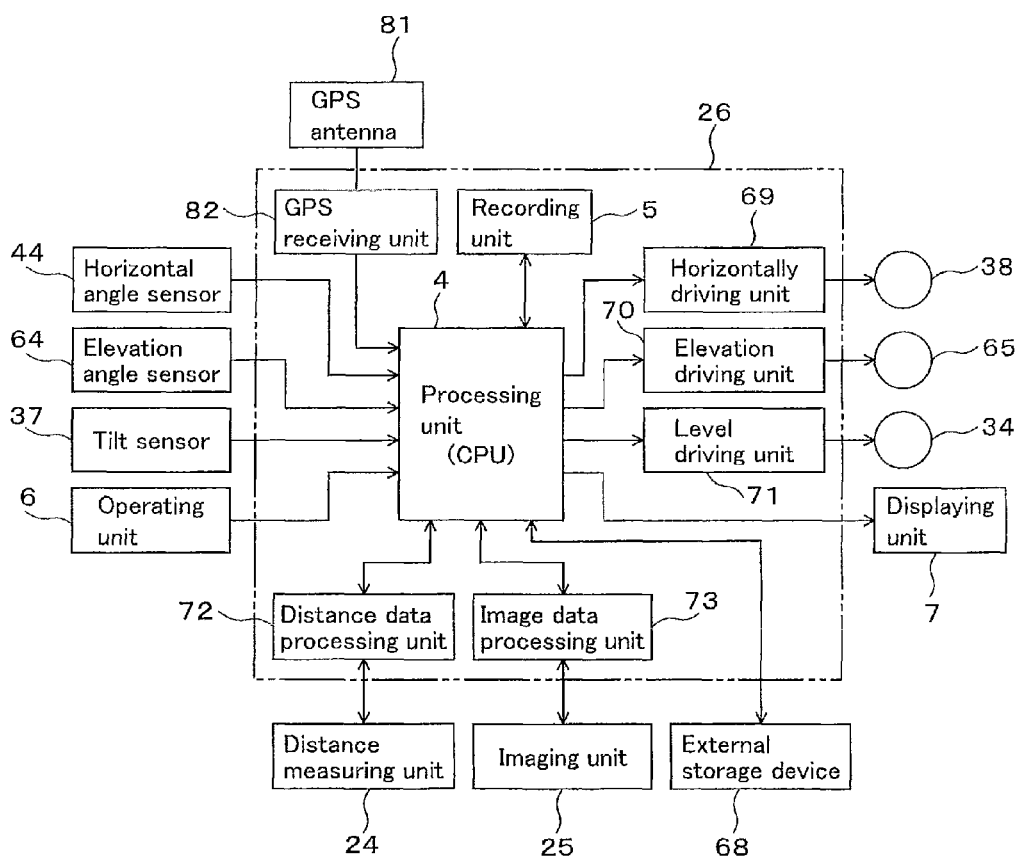
FIG. 12 is a block diagram of a controlling unit of an Example.

FIG. 12 is a block diagram of the controlling unit 26. The controlling unit 26 receives detection signals from the horizontal angle sensor 44, the elevation sensor 64, the tilt sensor 37, and the GPS antenna 81. The controlling unit 26 also receives instruction signals from a controller 6. The controlling unit 26 drives and controls the horizontal rotation driving motor 38, the elevation adjusting driving motor 65, and the level motor 34, and also controls a display 7 that displays working condition and measurement results, etc. The controlling unit 26 is removably provided with an external storage device 68 such as a memory card, a HDD, or the like.

The controlling unit 26 is formed of a processing unit 4, a memory 5, a horizontally driving unit 69, an elevation driving unit 70, a level driving unit 71, a distance data processing unit 72, an image data processing unit 73, etc. The memory 5 stores various programs, an integrating and controlling program for these programs, and various data such as measured data, image data, and the like. The programs include sequential programs necessary for measuring distances, elevation angles, and horizontal angles, calculation programs, programs for executing processing of measured data, and image processing programs. The programs also include programs for extracting planes from point cloud position data and calculating contours, image display programs for displaying the calculated contours on the display 7, and programs for controlling re-obtaining processing of the point cloud position data. The horizontally driving unit 69 drives and controls the horizontal rotation driving motor 38. The elevation driving unit 70 drives and controls the elevation adjusting driving motor 65. The level driving unit 71 drives and controls the level motor 34. The distance data processing unit 72 processes distance data that are obtained by the distance measuring unit 24. The image data processing unit 73 processes image data that are obtained by the imaging unit 25.

In addition, the controlling unit 26 has a GPS receiving unit 82. The GPS receiving unit 82 processes signals received from a GPS satellite by the GPS antenna, and it calculates the coordinate data on the earth. This is equal to a general GPS receiver. The positional information obtained from the GPS receiving unit is input to a point cloud position data processing unit 100'.

Figure 13:
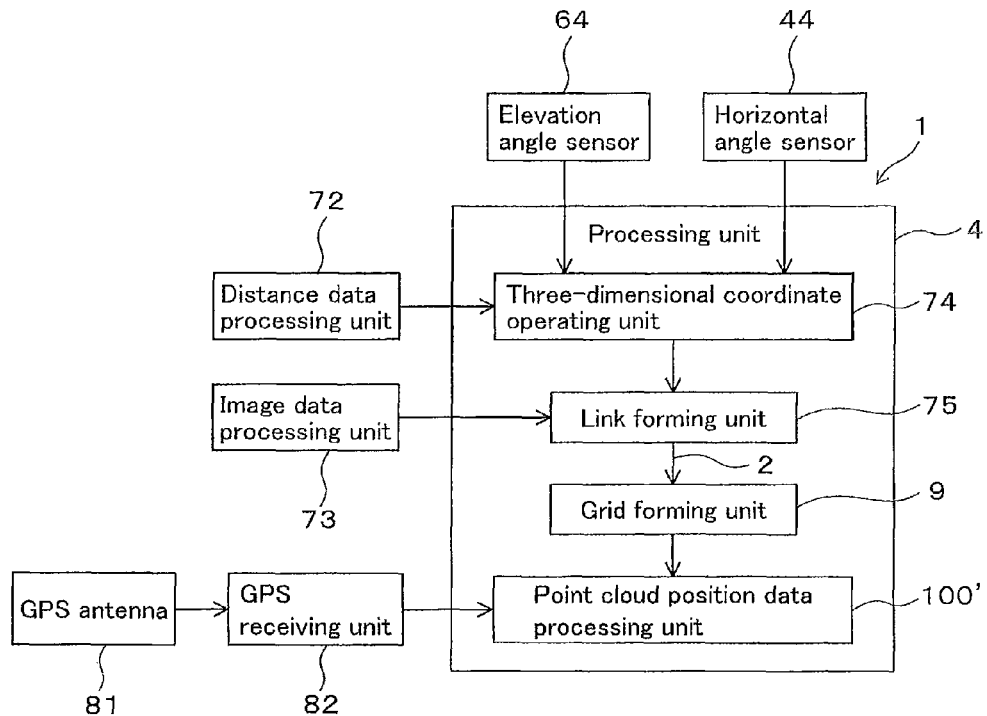
FIG. 13 is a block diagram of an operating unit of an Example.

FIG. 13 is a block diagram of the processing unit 4. The processing unit 4 has a three-dimensional coordinate calculating unit 74, a link forming unit 75, a grid forming unit 9, and a point cloud position data processing unit 100'. The three-dimensional coordinate calculating unit 74 receives the distance data of the target point from the distance data processing unit 72 and also receives direction data (horizontal angle and elevation angle) of the target point from the horizontal angle sensor 44 and the elevation sensor 64. The three-dimensional coordinate calculating unit 74 calculates three-dimensional coordinates (orthogonal coordinates) of each of the target points having the origin (0, 0, 0) at the position of the point cloud position data processing device 1, based on the received distance data and the received direction data.

The link forming unit 75 receives the image data from the image data processing unit 73 and data of three-dimensional coordinates of each of the target points, which are calculated by the three-dimensional coordinate calculating unit 74. The link forming unit 75 forms point cloud data 2 in which image data (RGB intensity of each of the target points) are linked with the three-dimensional coordinates. That is, the link forming unit 75 forms data by linking a position of a target point of the object in a two-dimensional image with three-dimensional coordinates of the target point. The linked data are calculated with respect to all of the target points and thereby form the point cloud position data 2.

The link forming unit 75 outputs the point cloud position data 2 to the grid forming unit 9. The grid forming unit 9 forms a grid (mesh) with equal distances and registers the nearest points on the intersection points of the grid when distances between adjacent points of the point cloud position data 2 are not constant. Alternatively, the grid forming unit 9 corrects all points to the intersection points of the grid by using a linear interpolation method or a bicubic method. When the distances between the points of the point cloud position data 2 are constant, the processing of the grid forming unit 9 may be skipped.

Figure 14:
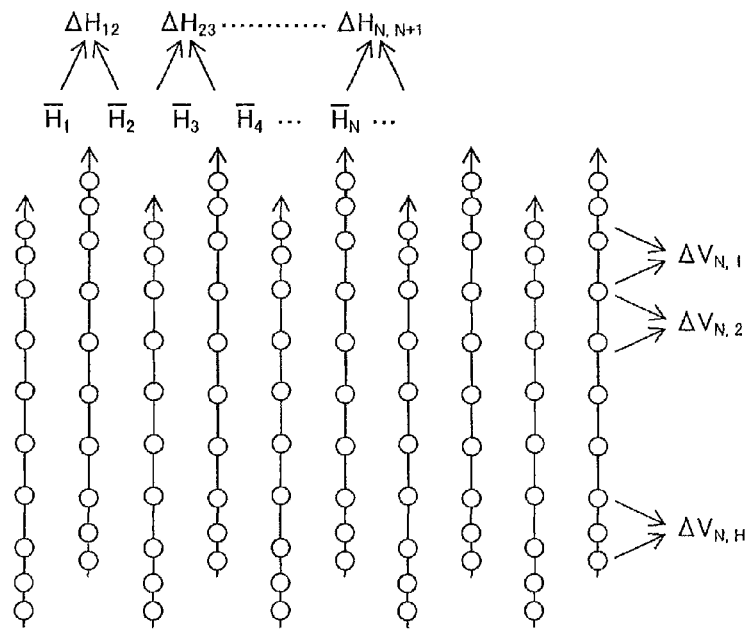
FIG. 14 is a conceptual diagram showing point cloud position data in which distance between points is not constant.
Figure 15:
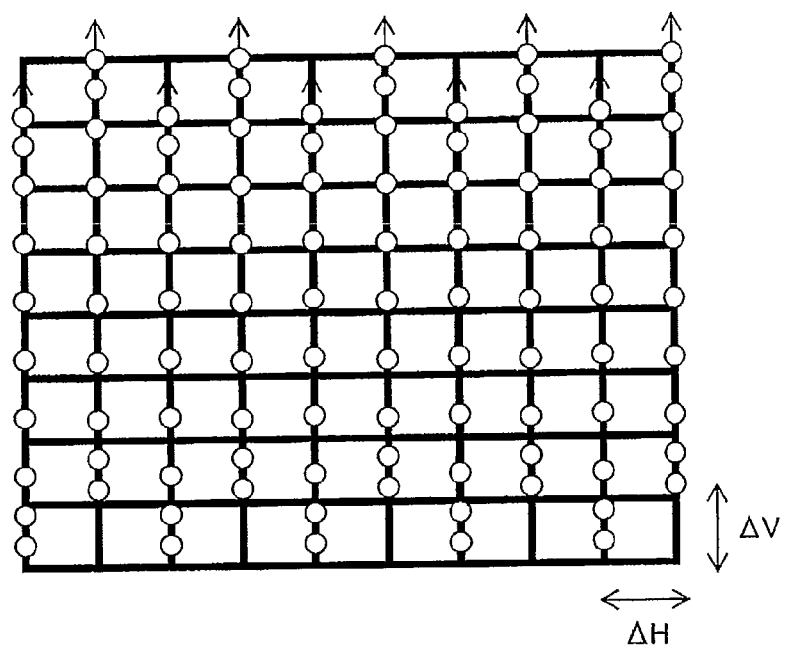
FIG. 15 is a conceptual diagram showing a grid formed.

A processing of forming the grid will be described hereinafter. FIG. 14 shows point cloud position data in which distances between the points are not constant, and FIG. 15 shows a formed grid. As shown in FIG. 14, an average horizontal distance $H_{1-N}$ of each line is obtained, and a difference $\Delta H_{i,j}$ of the average horizontal distances between the lines is calculated. Then, the difference $\Delta H_{i,j}$ is averaged and obtained as a horizontal distance $\Delta H$ of the grid (Formula 16). In regard to distances in the vertical direction, a distance $\Delta V_{N,H}$ between adjacent points in each line in the vertical direction is calculated. Then, an average of $\Delta V_{N,H}$ in the entire image of an image size W, H is obtained as a vertical distance $\Delta V$ (Formula 17). As shown in FIG. 15, a grid with the calculated horizontal distance $\Delta H$ and the calculated vertical distance $\Delta V$ is formed.

$$(\Sigma \Delta H_{i,j})/(N-1)=\Delta H \qquad \text{Formula 16}$$

$$(\Sigma \Delta V_{i,j})/(W \times H)=\Delta V \qquad \text{Formula 17}$$

Next, the nearest points are registered on the intersection points of the formed grid. In this case, predetermined threshold values are set for distances from each point to the intersection points so as to limit the register of the points. For example, the threshold values may be set to be half of the horizontal distance $\Delta H$ and be half of the vertical distance $\Delta V$. As in the case of the linear interpolation method and the bicubic method, all points may be corrected by adding weight according to the distances to the intersection points therefrom. In this case, if interpolation is performed, the points are essentially not measured points.

The point cloud position data that are thus obtained are output to the point cloud position data processing unit 100'. The point cloud position data processing unit 100' operates the processing that is described in the First Embodiment, and as a result, an obtained image is displayed on the display 7 of the liquid crystal display. This structure is the same as in the case that is described in the First Embodiment. The point cloud data processing unit 100' is a piece of hardware having the same function as that in the point cloud position data processing device 100 in FIG. 1 and is formed of a dedicated integrated circuit using a FPGA.

The coordinate data on the earth obtained from the GPS receiving unit 82 is input to a point cloud position data processing unit 100'. According to this structure, coordinates handled by the point cloud position data processing unit 100' are linked with the positional data (for example, digital map information) obtained from the GPS receiving unit. As a result, it is possible to display, for example, the location of the point cloud position data processing unit 1 with a laser scanner can be displayed on the digital map.

Other Matters

In the structure of the controlling unit 26, when the point cloud position data is output from the grid forming unit 9, the device shown in FIGS. 11 and 12 functions as a three-dimensional laser scanner, which can be used in combination with the point cloud position data processing device using the personal computer shown in the First Embodiment. The processing in which the point cloud position data processing device 100 and the point cloud position data processing unit 100' are carried out can be dispersed. For example, the composition in which a part of function of the point cloud position data processing unit 100 can be also carried out in a server connected by a communication line. In this case, it is grasped as an example of the point cloud position data processing systems of the present invention.

As a method for obtaining the image, a method for photographing using a CCD camera, etc., is typical; however, an image of the object can also be reproduced based on the point cloud data. When the point cloud position data is obtained by the laser scanner, data with respect to optical intensity of reflected light from each point is obtained. Therefore, the image of the object can be reproduced based on the point cloud position data by handling the point cloud position data as pixel data for forming the image of the object. That is, the image of the object can be obtained by using the laser scanner instead of photographing means such as CCD or CMOS image sensor, etc. In this case, in the image data obtaining unit 112, image data is obtained by the above principle based on point cloud position data output from the point cloud position data obtaining unit 101.

INDUSTRIAL APPLICABILITY

The present invention can be used in techniques of measuring three-dimensional information.

What is claimed is:

1. A point cloud position data processing device comprising:
   a point cloud position data obtaining circuit that obtains point cloud position data of an object to be measured;
   an image data obtaining circuit that obtains image data of the object;
   a correspondence relationship identifying circuit that identifies correspondence relationships between point cloud position data obtained in the point cloud position data obtaining circuit through a primary viewpoint or image data obtained in the image data obtaining circuit through the primary viewpoint and image data obtained in the image data obtaining circuit through a secondary viewpoint which is different from the primary viewpoint;
   a three-dimensional model forming circuit that forms a three-dimensional model from the point cloud position data obtained in the point cloud position data obtaining circuit;
   a three-dimensional model display controlling circuit that controls displaying of the three-dimensional model formed in the three-dimensional model forming circuit on an image displaying device;
   an occlusion detecting circuit that detects an occlusion part based on at least the point cloud position data obtained from the primary viewpoint; and
   a new viewpoint position calculating circuit that calculates a new viewpoint position at which point cloud position data of the occlusion part is obtained, wherein the three-dimensional model forming circuit forms a three-dimensional model having direction seen from the secondary viewpoint and processes embedding the occlusion part detected in the occlusion detecting circuit in the three-dimensional model, depending on the correspondence relationship identified in the correspondence relationship identifying circuit, before obtaining the point cloud position data in the secondary viewpoint, and the new viewpoint position calculation circuit calculates coordinates of a position C which is an intermediate point of a front edge and a position B, based on coordinates of the front edge A, in which the occlusion occurs, and coordinates of the position B, which exists on a back side plane toward a line of sight when it is viewed from the primary viewpoint, and set a rectangular isosceles triangle having a side formed by the primary viewpoint and the position C, thereby calculating coordinates of the new viewpoint.

* * * * *